United States Patent
Kunitake et al.

[11] Patent Number: 5,991,458
[45] Date of Patent: Nov. 23, 1999

[54] IMAGE QUALITY PREDICTION APPARATUS AND METHOD, AND IMAGE QUALITY CONTROL APPARATUS AND METHOD

[75] Inventors: Setsu Kunitake; Shunichi Kimura; Taro Yokose; Yutaka Koshi; Koh Kamizawa, all of Ashigarakami-gun, Japan

[73] Assignee: Fuji Xerox Co., Ltd., Tokyo, Japan

[21] Appl. No.: 08/912,112

[22] Filed: Aug. 15, 1997

[30] Foreign Application Priority Data

Aug. 29, 1996 [JP] Japan ................................ 8-229138

[51] Int. Cl.$^6$ ........................................... G06K 9/00
[52] U.S. Cl. ........................................ 382/254; 382/232
[58] Field of Search ............................. 358/261.3, 426, 358/432, 433; 348/415, 390, 420, 405, 404, 419, 409, 416, 395; 382/251, 232, 233, 235, 236, 238, 239, 240, 243, 244, 248, 250, 252, 253, 254, 266, 190, 195, 224, 274, 275, 282, 307, 173, 175, 176, 180, 181; 341/200; 375/243

[56] References Cited

U.S. PATENT DOCUMENTS

| | | |
|---|---|---|
| 5,121,216 | 6/1992 | Chen et al. ........................ 358/261.3 |
| 5,426,512 | 6/1995 | Watson .............................. 358/426 |
| 5,432,556 | 7/1995 | Hatano et al. ..................... 348/415 |
| 5,440,344 | 8/1995 | Asamura et al. ................... 348/405 |
| 5,654,760 | 8/1997 | Ohtsuki .............................. 348/405 |
| 5,677,969 | 10/1997 | Auyeung et al. .................. 382/239 |
| 5,682,442 | 10/1997 | Johnston et al. .................. 382/252 |
| 5,739,863 | 4/1998 | Ohtsuki .............................. 348/405 |
| 5,796,435 | 8/1998 | Nonomura et al. ............... 348/405 |
| 5,799,110 | 8/1998 | Israelsen et al. .................. 382/253 |

FOREIGN PATENT DOCUMENTS

| | | | |
|---|---|---|---|
| 6-165148 | 6/1994 | Japan .............................. H04N 7/133 |
| 6-165149 | 6/1994 | Japan .............................. H04N 7/133 |
| 7-135671 | 5/1995 | Japan .............................. H04N 11/04 |
| 7-177463 | 7/1995 | Japan .............................. H04N 5/91 |

OTHER PUBLICATIONS

"Multimedia fugouka no kokusai hyoujun" pp. 18–43—No Date of Public.; No Place of Public.; No Author's Name; No Title; No Publisher.

*Primary Examiner*—Bijan Tadayon
*Attorney, Agent, or Firm*—Oliff, & Berridge, PLC

[57] ABSTRACT

An image quality control apparatus having an image divider, a converter, an image analyzer, an image output property circuit, a quantization method selector, a quantizer and a coder. The image divider divides an input image into a plurality of divided images including a predetermined number of picture elements. The converter converts the divided images into converted coefficients. Then, the image analyzer determines a property of the divided images which is output by the image output property output circuit. A quantization selector selects a quantization method in response to the divided image property that was found by the image analyzer and the image output property output circuit. The quantizer quantizes the conversion coefficients found by the converter in accordance with the quantization methods selected by the quantization selector. A coder then codes the conversion coefficients quantized by the quantizer.

33 Claims, 27 Drawing Sheets

CONFIGURATION OF SECOND EMBODIMENT

CONFIGURATION OF ITEM-BY-ITEM IMAGE QUALITY CONTROL METHOD DETERMINATION MEANS

RELATIONSHIP BETWEEN IMAGE QUALITY AND CODING PARAMETER

CONFIGURATION OF THIRD EMBODIMENT

CONFIGURATION OF FOURTH EMBODIMENT

CONFIGURATION OF FIFTH EMBODIMENT
(IMAGE QUALITY PREDICTION MEANS)

CONFIGURATION OF SIXTH EMBODIMENT
(IMAGE QUALITY CONTROL METHOD DETERMINATION MEANS)

CONFIGURATION OF SEVENTH EMBODIMENT

CONFIGURATION OF ITEM-BY-ITEM IMAGE QUALITY PREDICTION MEANS

CONFIGURATION OF IMAGE QUALITY PREDICTION MEANS

CONFIGURATION OF INPUT IMAGE PROPERTY INPUT MEANS

IMAGE OUTPUT PROPERTY INPUT MEANS

IMAGE CODING PROPERTY INPUT MEANS

CONFIGURATION OF EIGHTH EMBODIMENT

CONFIGURATION OF ITEM-BY-ITEM IMAGE QUALITY CONTROL MEANS

CONFIGURATION OF INPUT IMAGE EDGE BUSINESS
EFFECT DEGREE DETERMINATION CIRCUIT

DETERMINATION OF OUTPUT DEVICE
EDGE BUSINESS EFFECT DEGREE

OUTPUT DEVICE EDGE BUSINESS EFFECT DEGREE

|  | RESOLUTION | | | | |
|---|---|---|---|---|---|
|  | NO. 1 | NO. 2 | NO. 3 | NO. 4 | NO. 5 |
| NO. OF GRAY LEVELS 16 | 1 | 1 | 2 | 2 | 2 |
| NO. OF GRAY LEVELS 32 | 1 | 2 | 2 | 3 | 3 |
| NO. OF GRAY LEVELS 64 | 2 | 2 | 3 | 3 | 4 |
| NO. OF GRAY LEVELS 128 | 3 | 3 | 3 | 4 | 5 |
| NO. OF GRAY LEVELS 256 | 3 | 3 | 4 | 5 | 5 |

CONFIGURATION OF OUTPUT DEVICE EDGE
BUSINESS EFFECT DEGREE DETERMINATION CIRCUIT

CONFIGURATION OF CODING SYSTEM EDGE
BUSINESS EFFECT DEGREE DETERMINATION CIRCUIT

CONFIGURATION OF EDGE BUSINESS DEGREE DETERMINATION CIRCUIT

CONFIGURATION OF INPUT IMAGE EDGE BUSINESS
EFFECT DEGREE DETERMINATION CIRCUIT

EDGE BUSINESS CONTROL METHOD DETERMINATION NO. 1

EDGE BUSINESS CONTROL METHOD DETERMINATION NO. 2

RELATIONSHIP BETWEEN EDGE BUSINESS DEGREE AND SCALING FACTOR

PREDICTION CODING NO. 1

PREDICTION CODING NO. 2

NONLINEAR QUANTIZATION

LINEAR QUANTIZATION

EXAMPLE OF SYSTEM TO WHICH THE INVENTION IS APPLIED

CONFIGURATION OF DCT CODING SYSTEM

SUBJECTIVE EVALUATION EXPERIMENT CHART

IMAGE QUALITY PREDICTION APPARATUS AND METHOD, AND IMAGE QUALITY CONTROL APPARATUS AND METHOD

BACKGROUND OF THE INVENTION

This invention relates to control techniques of the image quality of a decoded image and prediction techniques of the image quality of a decoded image when image compression is executed.

In recent years, images have been compressed for reducing the storage media capacity or the transmission time. In the description that follows, image coding is used in the same meaning as image compression.

As shown in FIG. 41, input images are compressed, transmitted, and stored in a system wherein image input machines such as scanners or image generation machines such as computers and image output machines such as printers are connected by a network. In recent years, images used in such a system have become high definition, colored, and a large capacity, thus it becomes important to raise the image compression ratio.

The image compression systems are classified into reversible and non-reversible systems. In the reversible compression system, if an image is decompressed after it is compressed, the original image can be restored completely. In the non-reversible compression system, a compression ratio higher than that in the reversible compression system can be expected, but if a compressed image is decompressed, it cannot completely be restored to the original image, causing degradation of the image quality.

Generally, to execute image compression, inversely proportional relationship would exist between the compression ratio and the image quality under the same coding conditions, because the non-reversible compression system realizes a high compression ratio by discarding information considered to be hard to affect the sight sense in an image. Thus, if the compression ratio is small, a small amount of information is discarded and the image quality is good; if the compression ratio is enlarged, discarded information is increased and the image quality is degraded.

When image compression is executed, it is desired to maintain a predetermined image quality and realize a high compression ratio as much as possible. That is, the coded image quality needs to be controlled so as to become the maximum permissible image quality.

Conventional non-reversible compression systems for controlling the coded image quality will be discussed below:

Conventional System 1

A conventional example of a system for generally controlling the image quality for improving the compression ratio of the whole input image will be discussed as conventional system 1.

An input image may change locally in property. If an image is coded by a coding system, it contains image portions whose image quality degradation is easy to see and those whose image quality degradation is hard to see. Considering the image quality of the whole input image, the whole compression ratio needs to be lessened to decrease degradation of the image portions whose image quality degradation is easy to see.

Then, an input image is divided into blocks and whether image degradation is easy or hard to see is determined for each block. The compression ratio is lowered or the quantization step size is narrowed for the block where image degradation is easy to see; the compression ratio is raised or the quantization step size is widened for the block where image degradation is hard to see, whereby the compression ratio of the portion where image degradation is hard to see can be raised, thus the whole compression ratio can be improved with the image quality made constant.

For example, a system using DCT (discrete cosine transform) typified by a JPEG (joint photographic coding experts group) system as described on Maruzen "Multimedia fugouka no kokusai hyoujun 18–43 pages" uses a quantization matrix adaptive to the property of an input image block, thereby providing a high compression ratio with the same image quality. The DCT coding system will be briefly discussed below with reference to FIG. 42.

In FIG. 42, numeral 391 is an input image, numeral 392 is a blocking circuit for blocking the input image 391, numeral 393 is an orthogonal transformation circuit for orthogonally transforming blocked image information, numeral 394 is an orthogonal transformation coefficient, numeral 395 is a quantization circuit for quantizing the orthogonal transformation coefficient 394, numeral 396 is a coding circuit for coding the quantized orthogonal transformation coefficient 394, and numeral 397 is a code.

The input image information 391 is separated into rectangular blocks by the blocking circuit 392. The blocked image information is orthogonally transformed by the orthogonal transformation circuit 393 and the orthogonal transformation coefficient 394 is output. The orthogonal transformation coefficient 394 is quantized by the quantization circuit 395 according to a predetermined quantization matrix. The quantized orthogonal transformation coefficient is assigned a code by the coding circuit 396 and is output as the code 397.

Since the coding system as shown in FIG. 42 executes the same quantization in all blocks, the image quality is degraded in blocks where distortion easily appears and visually fruitless information is coded in blocks where distortion is hard to appear.

Then, as described earlier, the conventional system is available which executes different quantization for the image portions whose image quality degradation is easy to see and those whose image quality degradation is hard to see, thereby raising the high compression ratio with the same image quality. The conventional system 1 will be discussed with reference to FIG. 43.

Parts identical with those previously described with reference to FIG. 42 are denoted by the same reference numerals in FIG. 43. In FIG. 43, numeral 398 is an image analysis circuit for analyzing the property of an image block, numeral 399 is the analysis result of the image analysis circuit 398, numeral 400 is a quantization selection circuit for selecting a quantization method based on the analysis result 399, and numeral 401 is a quantization method selected by the quantization selection circuit 400.

The operation of the conventional system 1 will be discussed with FIG. 43.

Blocked image information is sent to the image analysis circuit 398, which then analyzes the image property in each block. Various analysis methods are available and specific examples of the analysis methods will be described in conventional systems 1-1 and 1-2. Further, the analysis result 399 is sent to the quantization selection circuit 400, which then selects a quantization method 401. In the DCT coding system, the quantization selection circuit 400 selects an optimum quantization matrix for the analysis result 399.

The selected quantization method 401 is sent to the quantization circuit 395, which then uses the quantization method 401 to execute quantization. The operation of other components is the same as the operation in FIG. 42.

The image quality control system of the conventional system 1 will be discussed specifically using two examples of conventional systems 1-1 and 1-2 with reference to FIG. 43, which picks out the main parts of the conventional systems 1-1 and 1-2.

Conventional System 1-1

As the conventional system 1-1, techniques disclosed in the Unexamined Japanese Patent Application Publication No. Hei 6-165149 will be discussed. The conventional system 1-1 determines whether or not each input image block is appropriate for coding in the coding system used here and if the input image block is appropriate for coding, codes the block at a high compression ratio because high image quality can be expected. If the input image block is not appropriate for coding, the conventional system 1-1 codes the block at a low compression ratio to enhance the image quality because low image quality is expected.

For example, in the conventional system 1-1, the image analysis circuit 398 in FIG. 43 measures a physical amount 399 indicating easy occurrence of mosquito noise for each block. Further, the quantization selection circuit 400 selects a quantization parameter in response to the physical amount 399, thereby improving the compression ratio in the same image quality. Thus, control is performed so that the code amount increases in a block where mosquito noise easily occurs and that the code amount decreases in a block where mosquito noise is hard to occur, thereby providing a high compression ratio with the same image quality.

Specifically, in the conventional system 1-1, the image analysis circuit 398 puts a 3×3 pixel window on pixels in a block, finds an average value of the absolute values of the gradation level differences between contiguous pixels surrounding the center pixel, calculates the number of pixels with the ratio between the average value and the range width of gradation level signal in the block equal to or less than a predetermined threshold value, and determines whether mosquito noise easily occurs or is hard to occur depending on whether or not the number of pixels existing in the block is equal to or greater than a predetermined number.

Conventional System 1-2

As the conventional system 1-2, techniques disclosed in the Unexamined Japanese Patent Application Publication No. Hei 7-135671 will be discussed. The conventional system 1-2 determines whether or not each input image block is visually important and if the input image block is visually important, codes the block at a low compression ratio because high image quality is desired. If the input image block is not visually important, the conventional system 1-2 codes the block at a high compression ratio because the image quality may be low.

In the conventional system 1-2, the image analysis circuit 398 in FIG. 43 detects the number of pixels 399 with high red saturation in each block. Since red information is important for the sight sense of human beings, if the number of pixels 399 with high red saturation is large, the quantization selection circuit 400 selects such a quantization matrix as to lessen the compression ratio of the block; if the number of pixels 399 with high red saturation is small, the quantization selection circuit 400 selects such a quantization matrix as to increase the compression ratio of the block.

Specifically, in the conventional system 1-2, the blocking circuit 392 separates input image signal into blocks of luminance signal, Y signal, color difference signal, R-Y signal, and color difference signal, B-Y signal. The image analysis circuit 398 determines that a pixel with the R-Y signal higher than a predetermined threshold value is high in red saturation. Whether or not each pixel is high in red saturation is checked and if a block contains a predetermined number of pixels with high red saturation or more, the block is set to a superior block. The quantization method 401 controls so that the superior block is compressed at a low compression ratio.

Conventional System 1-3

As the conventional system 1-3, techniques disclosed in U.S. Pat. No. 5,121,216 will be discussed.

The conventional system 1-3 determines whether or not when distortion caused by coding is added to an input image block, it is easily visually perceived. When it is easily perceived, the conventional system 1-3 codes the input image block at a low compression ratio; when it is hard to perceive, the conventional system 1-3 codes the input image block at a high compression ratio, thereby providing a high compression ratio with the same image quality on the sight sense of human beings.

The conventional system 1-3 assumes that a complicated image is hard to perceive in distortion, and raises the compression ratio.

In the conventional system 1, the absolute subjective image quality is not described considering that the image quality is relative as to whether or not the human being seeing an image satisfies the image quality.

Conventional System 2

In the conventional systems, the relationships among input image signals, coding system parameters, and image quality are indicated and image input and output machines are fixed. In the conventional system 2, image control methods when the property of an input machine changes and when the property of an output machine changes will be discussed.

In a conventional system 2-1, an input machine example will be discussed and in a conventional system 2-2, an output machine example will be discussed.

Conventional System 2-1

As the conventional system 2-1, techniques disclosed in the Unexamined Japanese Patent Application Publication No. Hei 7-177463 will be discussed. The conventional system 2-1 controls a quantization table of data compression means based on an f number of aperture means for controlling the amount of light incident on image pick-up means. Since the f number is an amount representing the property of an image corresponding to the physical amount described in the conventional system 1, a quantization system can be controlled without analyzing an image.

The conventional system 2-1 will be discussed with reference to FIG. 44 which picks out parts related to the invention from the conventional system 2-1. In FIG. 44, numeral 411 is an image input through a lens, numeral 412 is an aperture for limiting the incident light amount, numeral 419 is a photoelectric conversion section for converting an input light signal into digital data by performing image pick-up, A/D conversion, signal processing, etc., numeral 414 is an f number of the aperture 411, numeral 415 is a compression ratio selection section for selecting a compression ratio based on the f number 414, numeral 413 is a compressing section for compressing data at a compression ratio selected by the compression ratio selection section 415, and numeral 418 is compressed data.

In FIG. 44, the f number 414 is a physical amount well representing the property of input image data and corresponds to the image analysis result 399 in FIG. 43. Thus, the compression ratio selection section 415 selects a quantization table from the f number 414 like the quantization selection circuit 400 in FIG. 43.

Specifically, if the f number is greater than a predetermined number, the compression ratio is lowered and if the f number is smaller than the predetermined number, the compression ratio is raised, thereby guaranteeing the image quality.

Conventional System 2-2

As the conventional system 2-2, techniques disclosed in the Unexamined Japanese Patent Application Publication No. Hei 6-165148 will be discussed.

To execute image communication, the conventional system 2-2 inquires about the display screen size of the associated terminal and codes data in a step size to enable sufficient image quality to be provided for the display screen size, whereby a high compression rate can be provided without degrading the display image quality if the associated terminal has a small display screen size. Thus, a large amount of moving information can be sent at the same line speed; resultantly, the subjective image quality is improved.

The relationship between the display screen size of the associated terminal and the quantization step size appropriate for the size is defined by a subjective evaluation experiment. That is, the quantization step size is changed for each display screen size and a subjective evaluation value called MOS (mean opinion score) is measured, for example, as shown in FIG. 45. The guaranteed performance of the image quality is determined on the MOS scale and the step size which becomes the guaranteed performance is found for each display size. In the example in FIG. 45, to transmit data to an associated terminal having display size 1, the data is coded in quantization step size 1. To transmit data to an associated terminal having display size 2, the data is coded in quantization step size 2. To transmit data to an associated terminal having display size 3, the data is coded in quantization step size 3.

The MOS, which is one of the subjective evaluation methods of the image quality, finds a mean opinion score of the determination results of the evaluators as to which of predetermined quality categories each image belongs to.

The conventional system 1 measures the physical amount of an input image and codes the input image with a coding parameter adaptive to the physical amount. The conventional system 2 measures the state of an input or output machine as a physical amount and codes data with a coding parameter adaptive to the state. In the conventional systems, the measured physical amounts are limited. That is, they are limited only to the measurement values of the feature amounts of input images in the conventional system 1; they are limited only to the measurement values of the feature amounts of input or output machines in the conventional system 2.

However, the factors affecting the actual image quality are not limited. They include the input image property, the input machine property, the output machine property, etc., as described in the conventional systems. Further, the property of the image coding system also affects the image quality although not described in the conventional systems.

In the conventional systems, image coding parameters are given in a one-to-one correspondence with input one-dimensional physical amounts; other factors affecting the image quality are fixedly considered. Thus, the systems are not designed for giving an appropriate coding parameter if a plurality of physical amounts are input.

The image quality depends on the sight sense characteristic of human beings and if the image quality affecting factors change independently of each other, the image quality changes nonlinearly. Thus, it is difficult to predict the image quality for the physical amount for which an actual subjective evaluation experiment is not carried out. It is considered that for this reason, hitherto, image quality control only with one-dimensional physical amounts has been performed.

Therefore, image quality control considering the properties of various image quality affecting factors cannot be performed.

SUMMARY OF THE INVENTION

It is therefore an object of the invention to provide an image quality control system that can measure the physical amounts of a plurality of factors affecting image quality and control the image quality from the measured physical amounts.

The principles of the invention will be first discussed. Hereinafter, the image quality felt by a human being who sees the whole image when an output image is presented will be referred to as total image quality.

First, an image quality degradation state is divided into items. The image quality degradation items are items that can be measured comparatively easily. The total image quality results from various factors and can be measure only by subjective evaluation, but the image quality for each image quality degradation item can be easily measured. The total image quality is determined by totalizing the image quality for each image quality degradation item.

Further, the image quality degradation state is divided into the image quality degradation items, whereby various input physical amounts of an input image property, an output machine property, an input machine property, an image coding system property, etc., are once converted into continuous parameters. The space consisting of the parameters can be made such a space where the image quality changes continuously.

Since the image quality in the space is continuous, if it is previously measured on a lattice, the image quality by image quality degradation item can be measured by interpolation, etc., from the points consisting of the parameters.

Thus, the invention converts various input physical amounts of an input image property, an output machine property, an input machine property, an image coding system property, etc., into continuous parameters for each divided image quality item and predicts the image quality of the image quality item from the parameters and the total image quality from the image quality for each image quality item.

Next, the invention will be discussed in more detail.

According to a first aspect of the invention, there is provided an image quality prediction system comprising a plurality of item-by-item image quality prediction means and total image quality prediction means for determining total evaluated image quality in response to degradation degrees predicted by the item-by-item image quality prediction means, characterized in that each of the item-by-item image quality prediction means comprises input image property space placement means for finding a position of an input image property in a space where a degradation degree varies continuously for the input image property having relation to an image quality degradation evaluation item causing image quality degradation of an input image, image coding property space placement means for finding a position of an image compression property in a space where a degradation degree varies continuously for the image compression property affecting the image quality degradation evaluation item causing image quality degradation of an image compressed in non-reversible coding, output device property space placement means for finding a position of an output device property in a space where a degradation degree varies continuously for the output device property affecting the image quality degradation evaluation item causing image quality degradation of an output image, and image quality degradation degree prediction means for predicting a degradation degree for the image quality degradation evaluation item of the image in response to the position of the input image property found by the input image property space placement means, the position of the image compression property found by the image coding property space placement means, and the position of the output device property found by the output device property space placement means, in relation to the corresponding image quality degradation evaluation item.

According to the configuration, various input physical amounts of the input image property, the output machine property, the input machine property, the image coding system property, etc., are converted into continuous parameters for each divided image quality item and the image quality of the image quality item can be predicted from the parameters and the total image quality can be predicted from the image quality for each image quality item.

In the configuration, each of the item-by-item image quality prediction means can further include input image property determination means being responsive to a parameter of an image input device for controlling an image quality of an image input through the image input device for finding a property of the input image and the input image property space placement means can use the input image property found by the input image property determination means.

Each of the item-by-item image quality prediction means can further include input image property determination means for analyzing an input image, thereby finding a property of the input image and the input image property space placement means can use the input image property found by the input image property determination means.

The total image quality prediction means can determine that the minimum value of the degradation degrees predicted by the image quality degradation degree prediction means contained in the item-by-item image quality prediction means is adopted as total evaluated image quality.

The total image quality prediction means can determine that the linear sum of the degradation degrees predicted by the image quality degradation degree prediction means contained in the item-by-item image quality prediction means is adopted as total evaluated image quality.

According to a second aspect of the invention, there is provided an image quality control system comprising a plurality of item-by-item image quality control method determination means and total image quality control means for determining a coding parameter in image compression to accomplish desired image quality in response to relationship between degradation degrees determined by the item-by-item image quality control method determination means and coding parameters, characterized in that each of the item-by-item image quality control method determination means comprises input image property space placement means for finding a position of an input image property in a space where a degradation degree varies continuously for the input image property having relation to an image quality degradation evaluation item causing image quality degradation of an input image, image coding property space placement means for finding a position of an image compression property in a space where a degradation degree varies continuously for the image compression property affecting the image quality degradation evaluation item causing image quality degradation of an image compressed in non-reversible coding, output device property space placement means for finding a position of an output device property in a space where a degradation degree varies continuously for the output device property affecting the image quality degradation evaluation item causing image quality degradation of an output image, and image quality control method determination means for determining relationship between a degradation degree for the image quality degradation evaluation item and a coding parameter in image compression in response to the position of the input image quality found by the input image property space placement means, the position of the image compression property found by the image coding property space placement means, and the position of the output device property found by the output device property space placement means, in relation to the corresponding image quality degradation evaluation item.

In the configuration, various input physical amounts of the input image property, the output machine property, the input machine property, the image coding system property, etc., are converted into continuous parameters for each divided image quality item and the image quality control method of the image quality item can be determined from the parameters and the total image quality can be controlled by the determined image quality control methods.

In the configuration, each of the item-by-item image quality control method determination means can further include input image property determination means being responsive to a parameter of an image input device for controlling an image quality of an image input through the image input device for finding a property of the input image and the input image property space placement means can use the input image property found by the input image property determination means.

Each of the item-by-item image quality control method determination means can further include input image property determination means for analyzing an input image, thereby finding a property of the input image and the input image property space placement means can use the input image property found by the input image property determination means.

The total image quality control means can determine a coding parameter to accomplish desired image quality and provide the minimum compression ratio based on the relationship between the degradation degree and coding parameter in image compression determined by the image quality control method determination means contained in each of the item-by-item image quality control method determination means.

According to a third aspect of the invention, there is provided an image quality control system comprising image division means for dividing an input image into given constant areas, conversion means for converting the image divided by the image division means and finding a conversion coefficient, image analysis means for finding a property of the image divided by the image division means, image output property output means for outputting a property of image output means, quantization method selection means for selecting a quantization method in response to the divided image property found by the image analysis means and the image output means property output by the image output property output means, quantization means for quantizing the conversion coefficient found by the conversion means by the quantization method selected by the quantization method selection means, and coding means for coding the conversion coefficient quantized by the quantization means.

According to the configuration, the quantization method is determined in response to the divided image property and the image output means property, so that fine image quality control is enabled.

In the configuration, the image output means property output by the image output property output means can include the effective number of gray levels of the image output means.

The image output means property output by the image output property output means can include the output frequency characteristic of the image output means.

The divided image property found by the image analysis means can include the line width in the divided image.

The divided image property found by the image analysis means can include a power distribution for each frequency of the divided image.

According to a fourth aspect of the invention, there is provided an image quality control system comprising image division means for dividing an input image into given constant areas, conversion means for converting the image divided by the image division means and finding a conversion coefficient, image analysis means for finding a property of the image divided by the image division means, image coding property output means for outputting a property of a quantization method and a property of the conversion means, quantization method selection means for selecting a quantization method in response to the divided image property found by the image analysis means and the quantization method property and the conversion means property output by the image coding property output means, quantization means for quantizing the conversion coefficient found by the conversion means by the quantization method selected by the quantization method selection means, and coding means for coding the conversion coefficient quantized by the quantization means.

In the configuration, the quantization method is determined in response to the divided image property, quantization method property, and the property of the conversion means for generating a conversion coefficient, so that finer image quality control is enabled.

In the configuration, the image output means property output by the image output property output means can include the effective number of gray levels of the image output means.

The conversion means property output by the image coding property output means can include a property related to discrete cosine transform.

The conversion means property output by the image coding property output means can include a property related to conversion based on prediction.

The image output means property output by the image output property output means can include the output frequency characteristic of the image output means.

The divided image property found by the image analysis means can include the line width in the divided image.

The divided image property found by the image analysis means can include a power distribution for each frequency of the divided image.

According to a fifth aspect of the invention, there is provided an image quality prediction system comprising a plurality of item-by-item image quality prediction means each comprising input image property input means for inputting a property of an input image affecting an image quality degradation evaluation item causing image quality degradation of an input image, image coding property input means for inputting a property of image compression affecting an image quality degradation evaluation item causing image quality degradation of an image compressed in non-reversible coding, output device property input means for inputting a property of an output device affecting an image quality degradation evaluation item causing image quality degradation of an output image, and image quality degradation degree prediction means for predicting a degradation degree for the image quality degradation evaluation item of the image in response to the input image property input by the input image property input means, the image compression property input by the image coding property input means, and the output device property input by the output device property input means, for a plurality of image quality degradation evaluation items, and total image quality prediction means for determining total evaluated image quality in response to evaluated image quality predicted by the image quality degradation degree prediction means contained in each of the item-by-item image quality prediction means.

Also in the configuration, various input physical amounts of the input image property, the output machine property, the input machine property, the image coding system property, etc., are converted into continuous parameters for each divided image quality item and the image quality of the image quality item can be predicted from the parameters and the total image quality can be predicted from the image quality for each image quality item.

In the configuration, each of the item-by-item image quality prediction means can further include a memory for storing evaluated image quality determined by the input image property, the image compression property, and the output device property and previously found by an evaluation experiment for each image quality degradation evaluation item and the image quality degradation degree prediction means can read the evaluated image quality stored in the memory by using the input image property input by the input image property input means, the image compression property input by the image coding property input means, and the output device property found by the output device property input means.

If evaluated image quality corresponding to the input image property input by the input image property input means, the image compression property input by the image coding property input means, and the output device property found by the output device property input means is not stored in the memory, the image quality degradation degree prediction means can use values close to the input image property input by the input image property input means, the image compression property input by the image coding property input means, and the output device property found by the output device property input means to read relationship between the evaluated image quality stored in the memory and coding parameter in image compression.

According to a sixth aspect of the invention, there is provided an image quality control system comprising a plurality of item-by-item image quality control method determination means each comprising input image property input means for inputting a property of an input image affecting an image quality degradation evaluation item causing image quality degradation of an input image, image coding property input means for inputting a property of image compression affecting an image quality degradation evaluation item causing image quality degradation of an image compressed in non-reversible coding, output device property input means for inputting a property of an output device affecting an image quality degradation evaluation item causing image quality degradation of an output image, and image quality control method determination means for determining relationship between a degradation degree for the image quality degradation evaluation item and coding parameter in image compression in response to the input image property input by the input image property input means, the image compression property input by the image coding property input means, and the output device property input by the output device property input means, for a plurality of image quality degradation evaluation items, desired image quality input means for an operator to enter desired image quality, and total image quality control means for determining a coding parameter to accomplish the desired image quality entered through the desired image quality input means in response to the relationship between the evaluated image quality and coding parameter determined by the image quality control method determination means contained in each of the item-by-item image quality control method determination means.

Also in the configuration, various input physical amounts of the input image property, the output machine property, the input machine property, the image coding system property, etc., are converted into continuous parameters for each divided image quality item and the image quality control method of the image quality item can be determined from the parameters and the total image quality can be controlled by the determined image quality control methods.

In the configuration, each of the item-by-item image quality control method determination means may further include a memory for storing relationship between evaluated image quality determined by the input image property, the image compression property, and the output device property and previously found by an evaluation experiment for each image quality degradation evaluation item and coding parameter in image compression and the image quality control method determination means may read the relationship between the evaluated image quality and coding parameter in image compression stored in the memory by using the input image property input by the input image property input means, the image compression property input by the image coding property input means, and the output device property found by the output device property input means.

If the relationship between the evaluated image quality and coding parameter in image compression corresponding to the input image property input by the input image property input means, the image compression property input by the image coding property input means, and the output device property found by the output device property input means is not stored in the memory, the image quality control method determination means may use values close to the input image property input by the input image property input means, the image compression property input by the image coding property input means, and the output device property found by the output device property input means to read the relationship between the evaluated image quality and coding parameter in image compression stored in the memory.

The image quality control system may further include input image analysis means for analyzing an input image and input image quality effect degree calculation means for calculating an effect degree for an image quality degradation evaluation item in response to the analysis result of the input image analysis means, and the input image property input means may input the effect degree calculated by the input image quality effect degree calculation means.

The input image analysis means can include as a property of the input image to be analyzed, any one or more of the number of pixel value types of the input image, pixel value change of peripheral pixels, power of low-frequency and high-frequency signals, and image quality when a given image is coded by a given coding system and the resultant image is output on a given output device.

The output device property input means may include as a property of an output device, any one or more of resolution of the output device, the number of gray levels, a frequency transfer characteristic, dot form, dot print accuracy, the number of halftone dot lines, halftone dot form, tone curve, contrast, and image quality when a given image is coded by a given coding system.

The image coding property input means may include as a property of image compression, any one or more of a blocking technique, a quantization characteristic, a frequency transfer characteristic, a subsampling technique, an interpolation technique, and a conversion technique when the image compression is executed, and image quality when a given image is output by a given output device.

The input image property input means may include as a property of an input image, any one or more of image quality when the input image is coded by a given coding system and the resultant image is output on a given output device and input camera aperture information, pixel density, pixel size, and the number of quantization bits of image input device property.

According to a seventh embodiment of the invention, there is provided an image quality control system comprising a plurality of item-by-item image quality control method determination means each comprising input image property input means for inputting a property of an input image affecting an image quality degradation evaluation item causing image quality degradation of an input image, image coding property input means for inputting a property of image compression affecting an image quality degradation evaluation item causing image quality degradation of an image compressed in non-reversible coding, output device information input means for inputting information concerning an output device, and image quality control method determination means for determining relationship between a degradation degree for the image quality degradation evaluation item and coding parameter in image compression in response to the input image property input by the input image property input means, the image compression property input by the image coding property input means, and the output device information input by the output device information input means, for a plurality of image quality degradation evaluation items, target image quality input means for inputting target image quality, and total image quality control means for determining a coding parameter to accomplish the target image quality input by the target image quality input means in response to the relationship between the evaluated image quality and coding parameter determined by the image quality control method determination means contained in each of the item-by-item image quality control method determination means.

Also in the configuration, various input physical amounts of the input image property, the input machine property, the image coding system property, etc., are converted into continuous parameters for each divided image quality item and the image quality control method of the image quality item can be determined from the parameters and output device information and the total image quality can be controlled by the determined image quality control methods.

The output device information is the output device type or output device identification information, for example. The output device types contain a xerographic printer, a silver salt photo printer, an offset printer, a CRT display, an LCD display, etc. The output device identification information contains the device names, the device numbers assigned by the manufacturers.

According to an eighth aspect of the invention, there is provided an image quality prediction method comprising step A of finding a position of an input image property in a space where a degradation degree varies continuously for the input image property having relation to an image quality degradation evaluation item causing image quality degradation of an input image, step B of finding a position of an image compression property in a space where a degradation degree varies continuously for the image compression property affecting an image quality degradation evaluation item causing image quality degradation of an image compressed in non-reversible coding, step C of finding a position of an output device property in a space where a degradation degree varies continuously for the output device property affecting an image quality degradation evaluation item causing image quality degradation of an output image, and step D of predicting a degradation degree for the image quality degradation evaluation item of the image in response to the position of the input image property found in the step A, the position of the image compression property found in the step B, and the position of the output device property found in the step C, for a plurality of image quality degradation evaluation items, and step E of determining total evaluated image quality in response to the evaluated image quality predicted for each of the image quality degradation evaluation items.

Also in the configuration, various input physical amounts of the input image property, the output machine property, the input machine property, the image coding system property, etc., are converted into continuous parameters for each divided image quality item and the image quality of the image quality item can be predicted from the parameters and the total image quality can be predicted from the image quality for each image quality item.

According to a ninth aspect of the invention, there is provided an image quality control method comprising step A of finding a position of an input image property in a space where a degradation degree varies continuously for the input image property having relation to an image quality degradation evaluation item causing image quality degradation of an input image, step B of finding a position of an image compression property in a space where a degradation degree varies continuously for the image compression property affecting an image quality degradation evaluation item causing image quality degradation of an image compressed in non-reversible coding, step C of finding a position of an output device property in a space where a degradation degree varies continuously for the output device property affecting an image quality degradation evaluation item causing image quality degradation of an output image, and step D of determining relationship between a degradation degree for the image quality degradation evaluation item and coding parameter in image compression in response to the position of the input image property found in the step A, the position of the image compression property found in the step B, and the position of the output device property found in the step C, for a plurality of image quality degradation evaluation items, and step E of determining a coding parameter to accomplish desired image quality in response to the relationship between the evaluated image quality and coding parameter determined for each of the image quality degradation evaluation items.

Also in the configuration, various input physical amounts of the input image property, the output machine property, the input machine property, the image coding system property, etc., are converted into continuous parameters for each divided image quality item and the image quality control method of the image quality item can be determined from the parameters and the total image quality can be controlled by the determined image quality control methods.

In the description made so far, the image quality or image quality degradation for the image quality evaluation or image quality degradation evaluation items of an image also includes objective evaluation image quality values that can be measured as physical amounts in addition to the values of the subjective evaluation image quality felt by the observer for the blur, edge business, etc., of the image.

DETAILED DESCRIPTION OF THE PREFERRED EMBODIMENTS

Referring now to the accompanying drawings, there are shown preferred embodiments of the invention.

Embodiment 1

The image quality generally depends on the properties of an input image, an image output device, and an image coding system. An image quality prediction system of a first embodiment of the invention predicts the image quality on a space converted into values independent of the properties. To provide the space independent of input/output of an image or the coding system, the image quality is divided into image quality degradation items. The image quality or image quality degradation for the image quality evaluation or image quality degradation evaluation items of an image also includes objective evaluation image quality values that can be measured as physical amounts in addition to the values of the subjective evaluation image quality felt by the observer for the blur, edge business, etc., of the image.

The first embodiment will be discussed with reference to FIGS. 1, 2, and 3.

Figure 1:
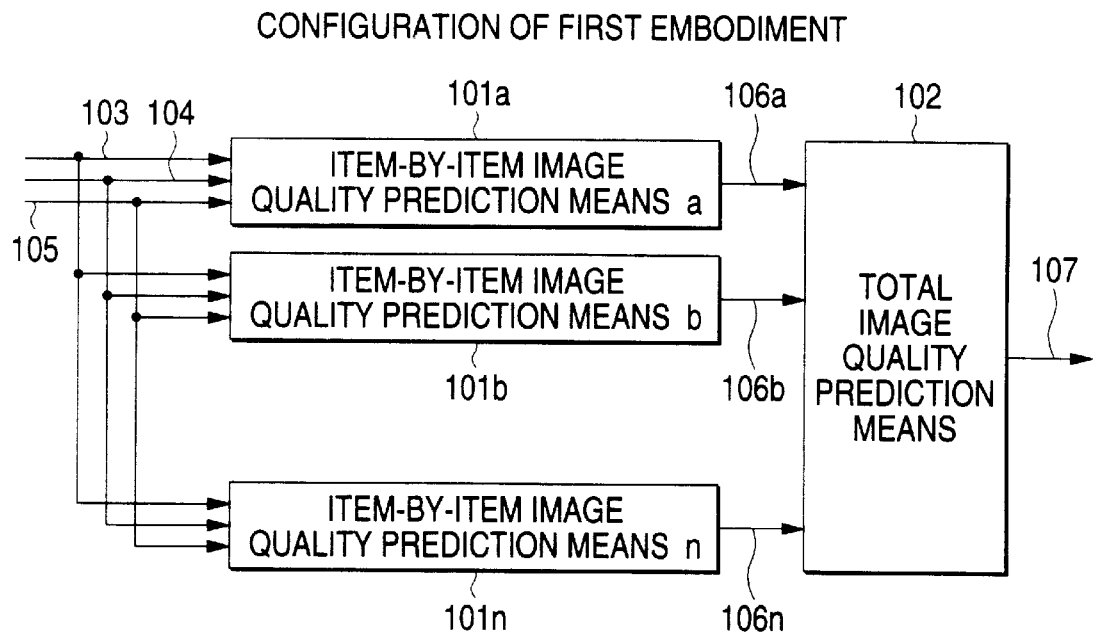
FIG. 1 is a block diagram to show the configuration of a first embodiment of the invention.

FIG. 1 shows the image quality prediction system of the first embodiment as a whole. In FIG. 1, the image quality prediction system consists of a plurality of item-by-item image quality prediction means $101a$–$101n$ and total image quality prediction means 102. The corresponding input image property 103, image output property 104, and image coding property 105 are input to each of the item-by-item image quality prediction means $101a$–$101n$, each of which then predicts the image quality by item based on the corresponding input image property 103, image output property 104, and image coding property 105 and outputs item-by-item predicted image quality $106a$–$106n$. The total image quality prediction means 102 outputs total image quality 107 based on the item-by-item predicted image qualities $106a$–$106n$.

Figure 2:
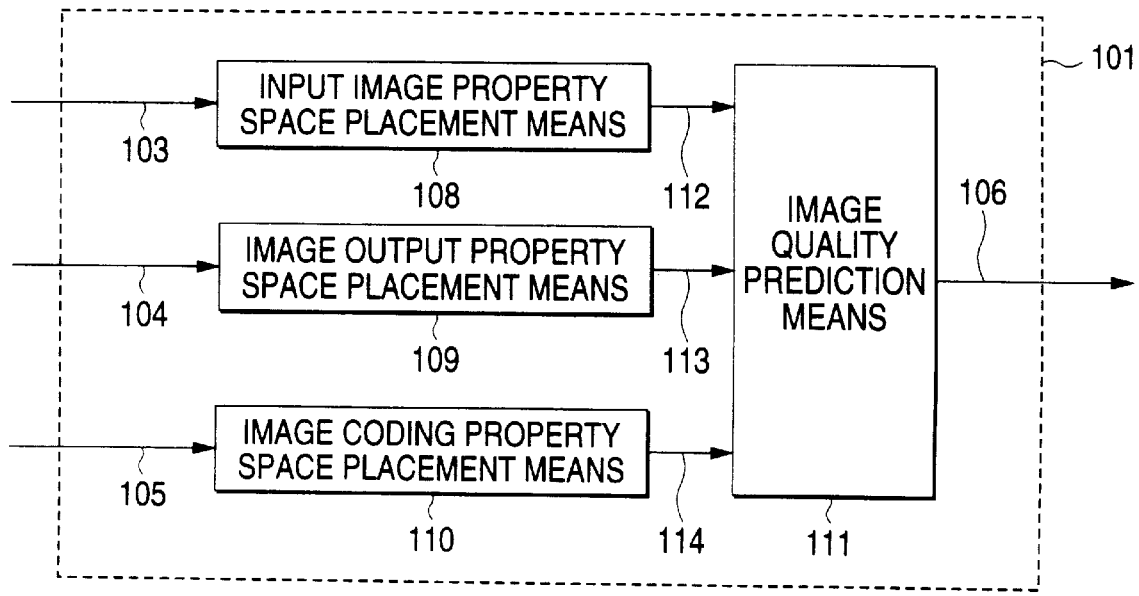
FIG. 2 is a block diagram to show the main part of the first embodiment of the invention.

FIG. 2 shows the configuration of the item-by-item image quality prediction means 101 ($101a$–$101n$). In the figure, the item-by-item image quality prediction means 101 consists of input image property space placement means 108, image output property space placement means 109, image coding property space placement means 110, and image quality prediction means 111. The input image property space placement means 108, the image output property space placement means 109, and the image coding property space placement means 110 calculate and output an input image property intra-space position 112, an image output property intra-space position 113, and an image coding property intra-space position 114, respectively, based on the input image property 103, the image output property 104, and the image coding property 105. The image quality prediction means 111 outputs item-by-item predicted image quality 106 based on the input image property intra-space position 112, the image output property intra-space position 113, and the image coding property intra-space position 114.

Figure 3:
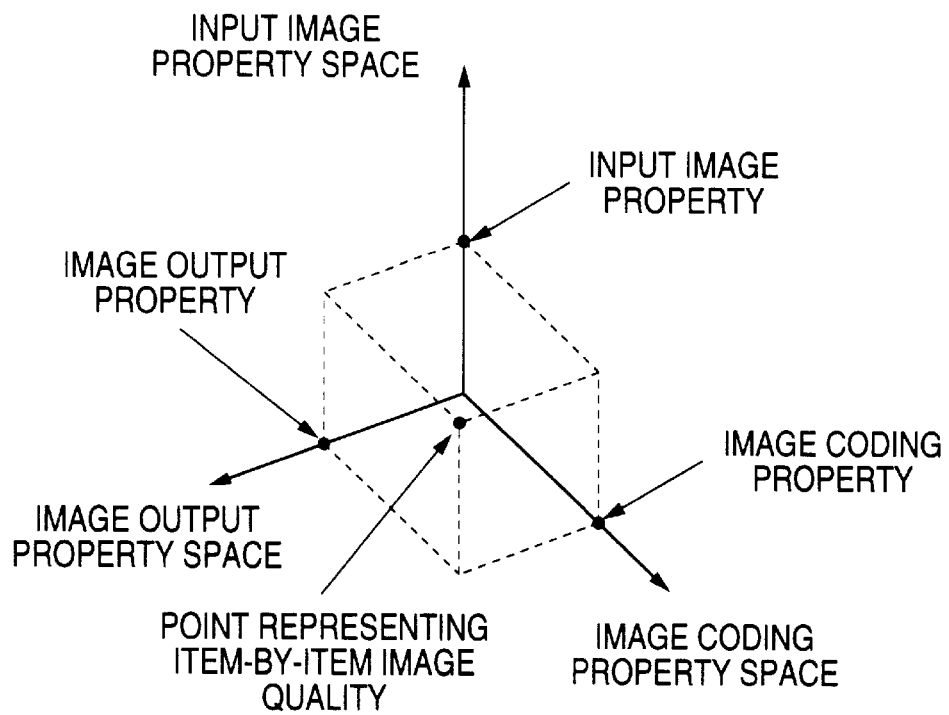
FIG. 3 is an illustration to explain the principles of the first embodiment of the invention.

FIG. 3 illustrates an input image property space, an image output property space, and an image coding property space by image quality degradation item. For simplicity, FIG. 3 assumes that each space is one dimension.

In FIGS. 1 and 2, the input image property 103 indicating easy occurrence of image degradation for each of image degradation items of block distortion, blur, etc., is input to the input image property space placement means 108, which then places the input image property in the point of the input image property in FIG. 3 and outputs the input image property intra-space position 112. The input image property 103 is the edge amount, signal power at one frequency, etc., for example.

Likewise, the image output property 104 and the image coding property 105 are also placed in the image output property space and the image coding property space as easy occurrence of image quality degradation with respect to the sight sense for each image degradation item, and the image output property intra-space position 113 and the image coding property intra-space position 114 are output. The image output property 104 is printer output resolution, etc., for example. The image coding property 105 is a DCT coefficient quantization matrix, etc., for example.

The input image property space, the image output property space, and the image coding property space are taken so as to be contiguous with each other.

Assuming that the number of dimensions of the input image property space is A, that that of the image output property space is B, and that that of the image coding property space is C, an (A+B+C) dimensional space with the spaces as partial spaces can be put. The image quality can be measured for each point in the space. Hereinafter, the (A+B+C) dimensional space will be called item-by-item image quality space.

The image quality prediction means 111 predicts image quality values by item and outputs item-by-item predicted image quality 106. That is, the image quality on the lattice points in the item-by-item image quality space in FIG. 3 is previously measured. The input image property space, the image output property space, and the image coding property space, which are defined as easy occurrence of image degradation of the corresponding image degradation items, do not depend on the input image, image output means, or image coding system. Since the input image property space, the image output property space, and the image coding property space are contiguous with each other, the image quality in the item-by-item image quality space is assumed to be continuous, and the image quality evaluation values on the lattice points previously measured are used to predict the image quality.

The image quality is classified into items, whereby the number of dimensions of the item-by-item image quality space can be decreased.

The item-by-item predicted image quality 106 thus provided is input to the total image quality prediction means 102 for finding the total image quality 107.

The property of an input image may be determined by the property of an image input machine, such as aperture information of an input camera. It may be found by analyzing the input image. For example, the edge amount, signal power at a predetermined frequency, etc., may be analyzed.

To previously measure the image quality in the item-by-item image quality space, the number of measurement points should be lessened as much as possible. Thus, the number of dimensions of each of the input image property space, the image output property space, and the image coding property space should be lessened as much as possible.

The image degradation items should be finely divided so that the number of dimensions of each of the input image property space, the image output property space, and the image coding property space is set to one. In doing so, previous subjective evaluation is facilitated. For example, the image degradation items are measured for each density value of an image, whereby the number of dimensions of each space can be decreased.

The total image quality prediction means 102 can use the minimum value or the linear sum of the item-by-item predicted image qualities 106 as the total image quality 107.

The image output property also includes image output resolution and the number of gray levels. Information concerning an output device, such as the type or identification information of the output device, may be entered as the image output property to indirectly specify the image output property. The output device types contain a xerographic printer, a silver salt photo printer, an offset printer, a CRT display, an LCD display, etc. The output device identification information contains the device names, the device numbers assigned by the manufacturers.

Embodiment 2

Next, a second embodiment of the invention will be discussed. In the first embodiment, the image quality of an output image is predicted from the input image property, the image output property, and the image coding property. In the second embodiment, the relationship between the image quality of an output image and image coding parameters is predicted from the input image property, the image output property, and the image coding property from which image coding parameters are removed, thereby enabling coding in the specified image quality.

The second embodiment will be discussed with reference to FIGS. 4, 5, 6, and 7.

Figure 4:
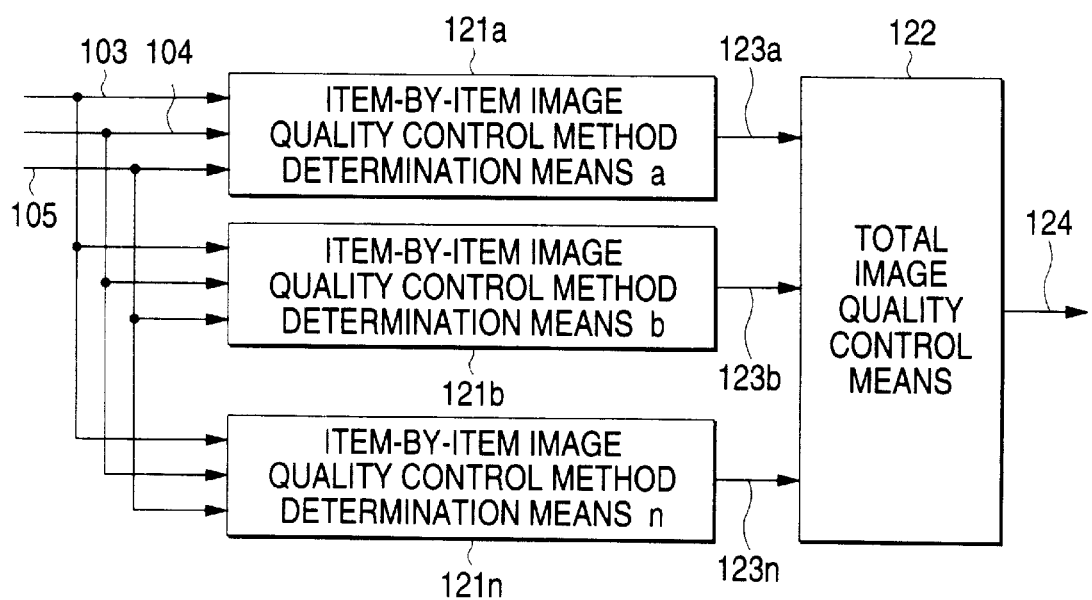
FIG. 4 is a block diagram to show the configuration of a second embodiment of the invention.

FIG. 4 shows an image quality control system of the second embodiment as a whole. Parts identical with or similar to those previously described with reference to FIG. 1 are denoted by the same reference numerals in FIG. 4. In FIG. 4, the image quality control system consists of a plurality of item-by-item image quality control method determination means 121a–121n and total image quality control means 122. The corresponding input image property 103, image output property 304, and image coding property 105 (from which coding parameters are removed) are input to each of the item-by-item image quality control method determination means 121a–121n, each of which then outputs image control method 123a–123n based on the corresponding input image property 103, image output property 104, and image coding property 105. The total image quality control means 122 determines and outputs a total coding parameter 124 based on the image control methods 123a–123n.

Figure 5:
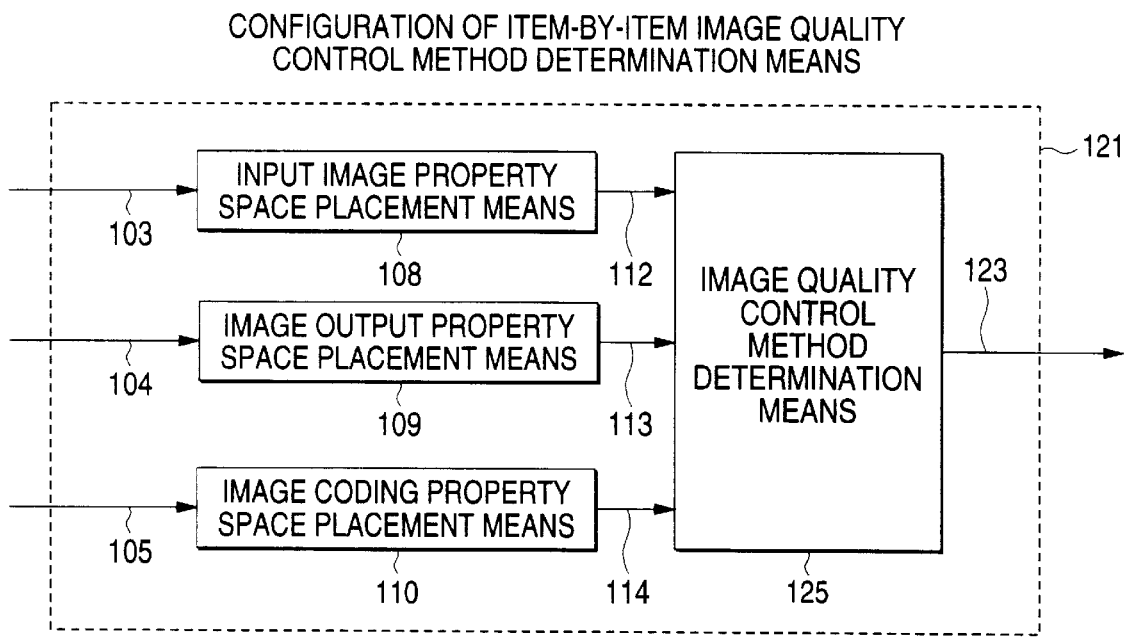
FIG. 5 is a block diagram to show the main part of the second embodiment of the invention.

FIG. 5 shows the configuration of the item-by-item image quality control method determination means 121 (121a–121n). Parts identical with or similar to those previously described with reference to FIG. 2 are denoted by the same reference numerals in FIG. 5. In FIG. 5, the item-by-item image quality control method determination means 121 consists of input image property space placement means 108, image output property space placement means 109, image coding property space placement means 110, and image quality control method determination means 125. The input image property space placement means 108, the image output property space placement means 109, and the image coding property space placement means 110 calculate and output an input image property intra-space position 112, an image output property intra-space position 113, and an image coding property intra-space position 114, respectively, based on the input image property 103, the image output property 104, and the image coding property 105. The image quality control method determination means 121 outputs image quality control method 123 based on the input image property intra-space position 112, the image output property intra-space position 113, and the image coding property intra-space position 114.

Figure 6:
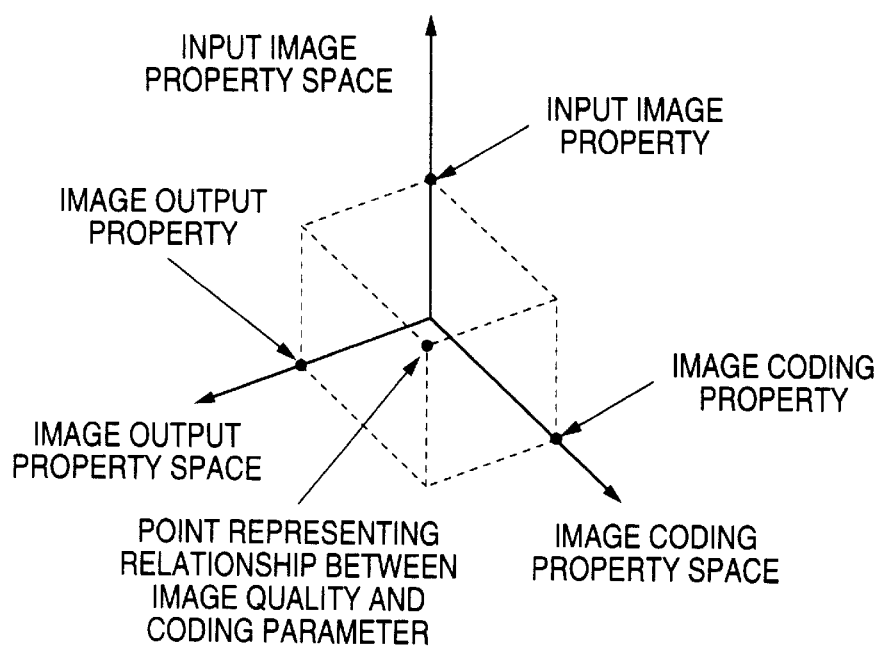
FIG. 6 is an illustration to explain the principles of the second embodiment of the invention.
Figure 7:
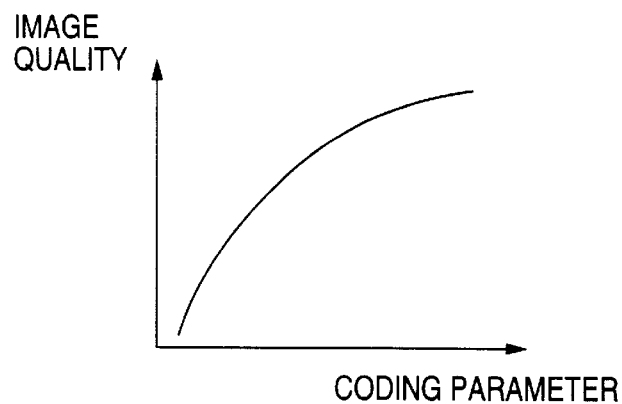
FIG. 7 is an illustration to explain the principles of the second embodiment of the invention.

As shown in FIG. 6, the image coding property from which some image coding parameters are removed, the input image property, and the image output property 104 are placed in an item-by-item image quality space. Here, the item-by-item image quality space shows the relationship between the coding parameters and the image quality, as shown in FIG. 7.

The total image quality control means 122 finds a coding parameter to enable desired image quality to be provided for each image quality degradation item and finds a coding parameter to enable desired image quality to be provided on the whole.

Also in the second embodiment, the property of an input image may be determined by the property of an image input machine, such as aperture information of an input camera. It may be found by analyzing the input image. For example, the edge amount, signal power at a predetermined frequency, etc., may be analyzed.

To previously measure the image quality in the item-by-item image quality space, the number of measurement points should be lessened as much as possible. Thus, the number of dimensions of each of the input image property space, the image output property space, and the image coding property space should be lessened as much as possible.

The image degradation items should be finely divided so that the number of dimensions of each of the input image property space, the image output property space, and the image coding property space is set to one. In doing so, previous subjective evaluation is facilitated. For example, the image degradation items are measured for each density value of an image, whereby the number of dimensions of each space can be decreased.

The total image quality control means 122 may adopt a coding parameter for minimizing the compression ratio among the coding parameters satisfying the desired image quality as the final coding parameter based on the relationship between the image quality and the coding parameters.

The image output property also includes image output resolution and the number of gray levels. Information concerning an output device, such as the type or identification information of the output device, may be entered as the image output property to indirectly specify the image output property. The output device types contain a xerographic printer, a silver salt photo printer, an offset printer, a CRT display, an LCD display, etc. The output device identification information contains the device names, the device numbers assigned by the manufacturers.

Embodiment 3

A third embodiment of the invention provides an image coding system that can control the image quality when an image output device changes.

Figure 8:
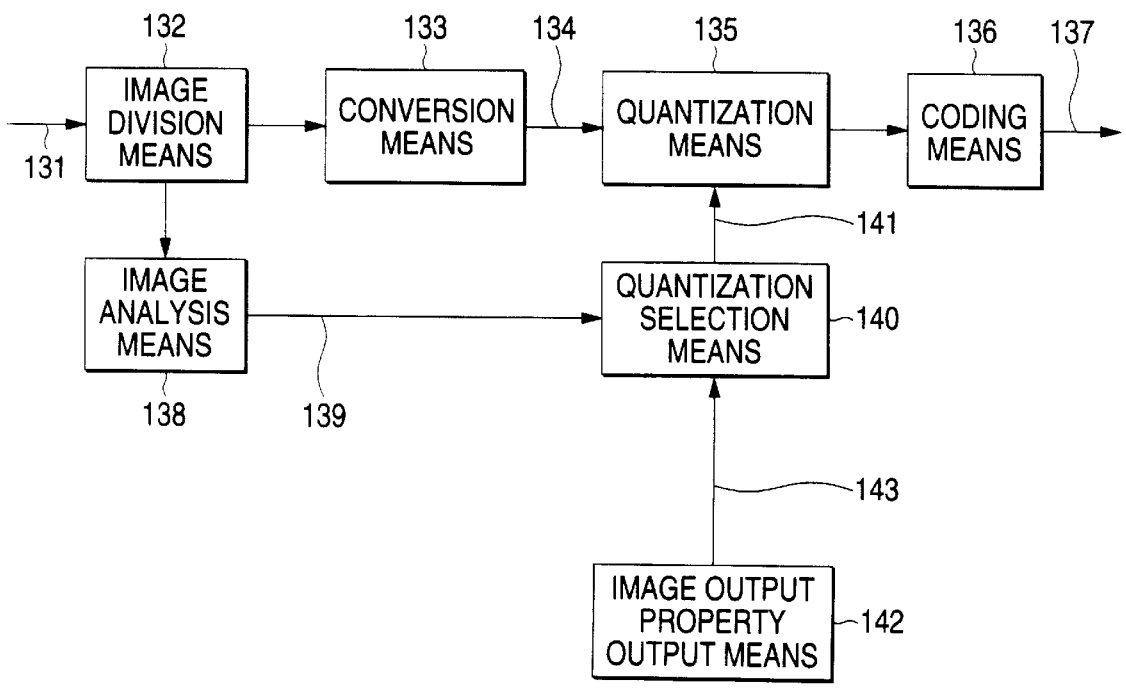
FIG. 8 is a block diagram to show the configuration of a third embodiment of the invention.

FIG. 8 shows the configuration of the third embodiment. In the figure, numeral 131 is an input image, numeral 132 is image division means for dividing the input image 131 into blocks, numeral 133 is conversion means for converting the divided image, numeral 134 is a conversion coefficient, numeral 135 is quantization means for quantizing the conversion coefficient 134, numeral 136 is coding means for coding the quantized conversion coefficient, numeral 137 is a code, numeral 138 is image analysis means for analyzing the divided image and outputting an input image property, numeral 139 is an input image property, numeral 140 is quantization selection means, numeral 141 is a selected quantization method, numeral 142 is image output property output means, and numeral 143 is an image output property.

The input image 131 is divided into blocks by the image division means 132 and converted into the conversion coefficient 134 by the conversion means 133. Further, the image divided into blocks is analyzed by the image analysis means 138 and sent to the quantization selection means 140 as the input image property 139. Further, the image output property output means 142 outputs the image output property 143 to the quantization selection means 140.

The quantization selection means 140 consists of item-by-item image quality control method determination means 121 and total image quality control means 122 in FIG. 4 and selects a quantization method of a coding parameter providing predetermined image quality.

The quantization means 135 quantizes the conversion coefficient 134 by the selected quantization method and the coding means 136 outputs code 137.

The conversion means 133 can adopt a prediction method of predicting a coding pixel value from discrete cosine transform or pixel values in the proximity, for example.

The effective number of gray levels or output frequency characteristic can be used as the image output property 143.

The image analysis means 138 detects the line width and power spectrum of an input image, for example.

Embodiment 4

Figure 9:
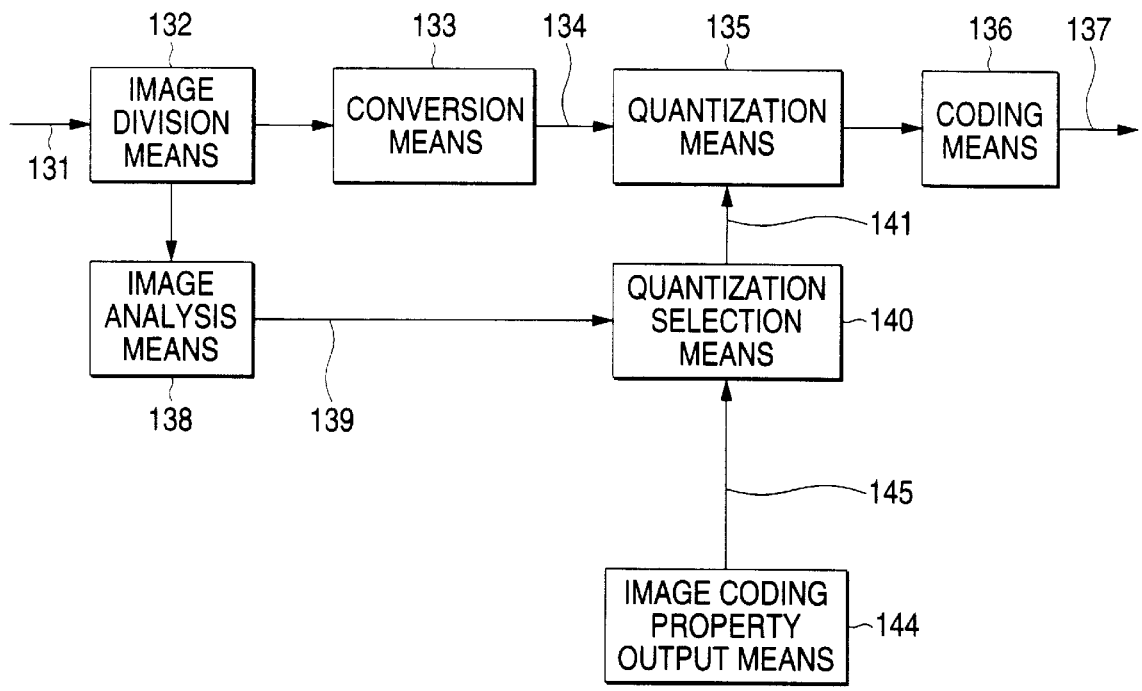
FIG. 9 is a block diagram to show the configuration of a fourth embodiment of the invention.

A fourth embodiment of the invention provides an image coding system that can control the image quality when the image coding property changes. FIG. 9 shows the configuration of the fourth embodiment. In the embodiment, image coding property output means 144 outputs an image coding property 145 and a quantization method is determined based on the image coding property 145. The fourth embodiment is the same as the third embodiment except that the image output property output means 142 in FIG. 8 becomes the image coding property output means 144 or that the image output property 143 in FIG. 8 changes to the image coding property 145, and will not be discussed again in detail.

Embodiment 5

Figure 10:
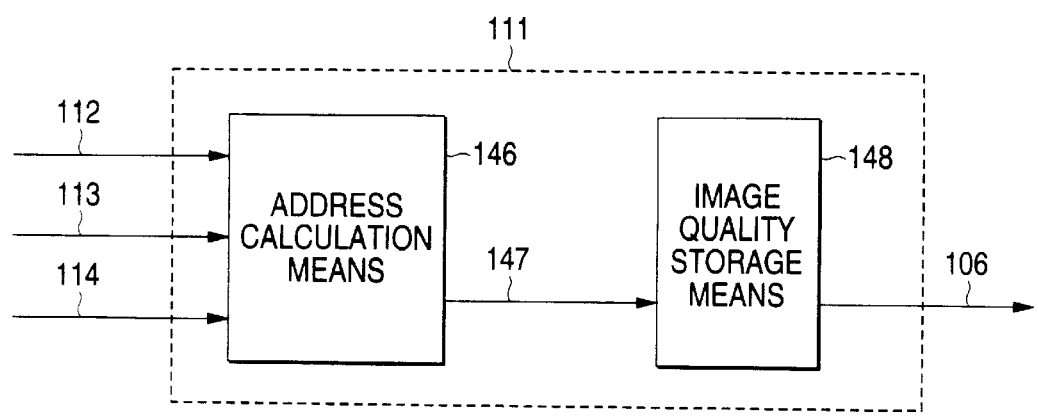
FIG. 10 is a block diagram to show the configuration of a fifth embodiment of the invention.

A fifth embodiment of the invention provides a specific configuration of the image prediction means 111 of the first embodiment. FIG. 10 shows a configuration example of the fifth embodiment. In the figure, numeral 146 is address calculation means, numeral 147 is an address, and numeral 148 is image storage means. Image quality is stored in the image storage means 148. The address 147 at which the image quality is stored can be found from an input image property intra-space position 112, an image output property intra-space position 113, and an image coding property intra-space position 114. The address calculation means 146 calculates the address 147 and sends it to the image storage means 148, which then outputs predicted image quality 106 corresponding to the address 147.

Embodiment 6

Figure 11:
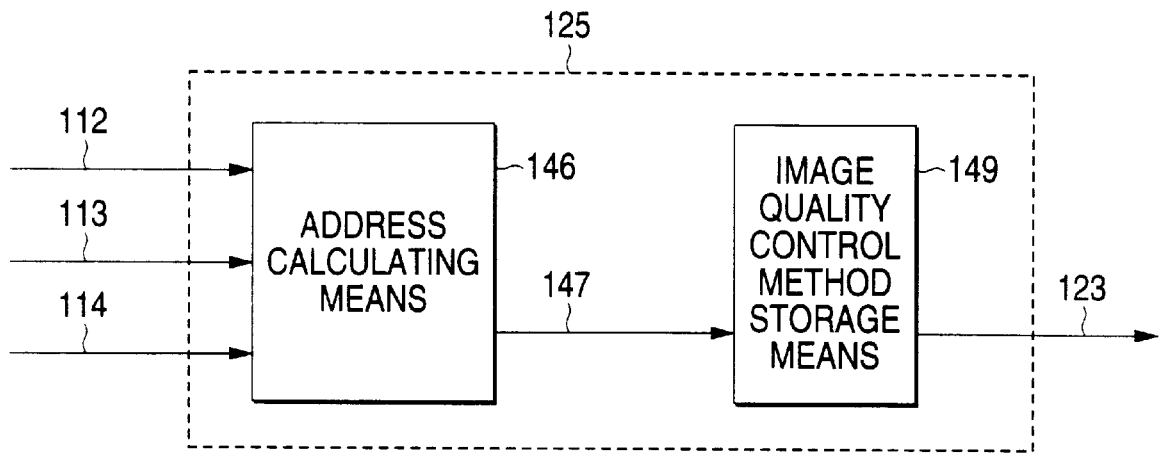
FIG. 11 is a block diagram to show the configuration of a sixth embodiment of the invention.

A sixth embodiment of the invention provides a specific configuration of the image quality control method determination means 125 of the second embodiment. FIG. 11 shows a configuration example of the sixth embodiment. In the figure, numeral 149 is image quality control method storage means. Although the image quality storage means 148 in FIG. 10 outputs the predicted image quality 106, the image quality control method storage means 149 in FIG. 11 outputs an image quality control method 123.

Embodiment 7

Figure 12:
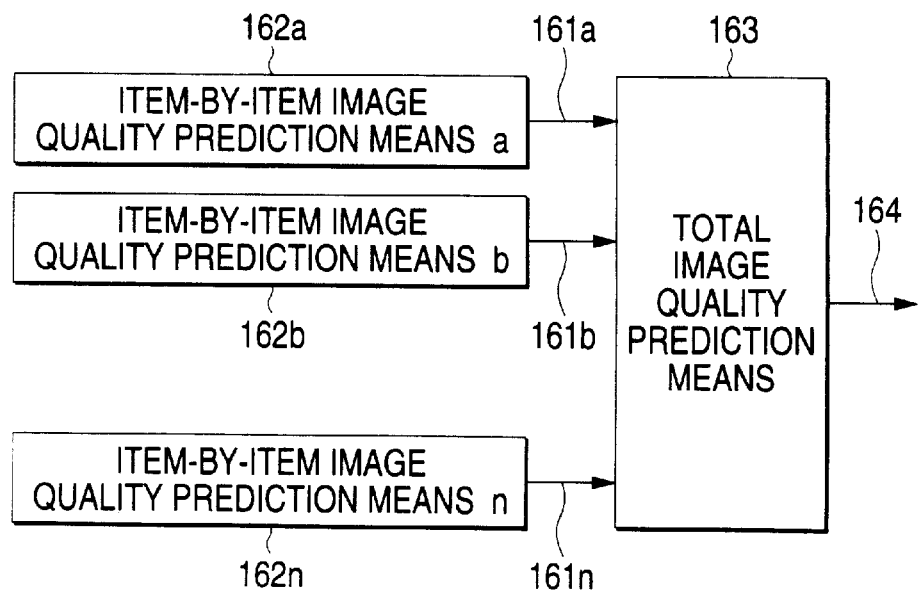
FIG. 12 is a block diagram to show the configuration of a seventh embodiment of the invention.
Figure 13:
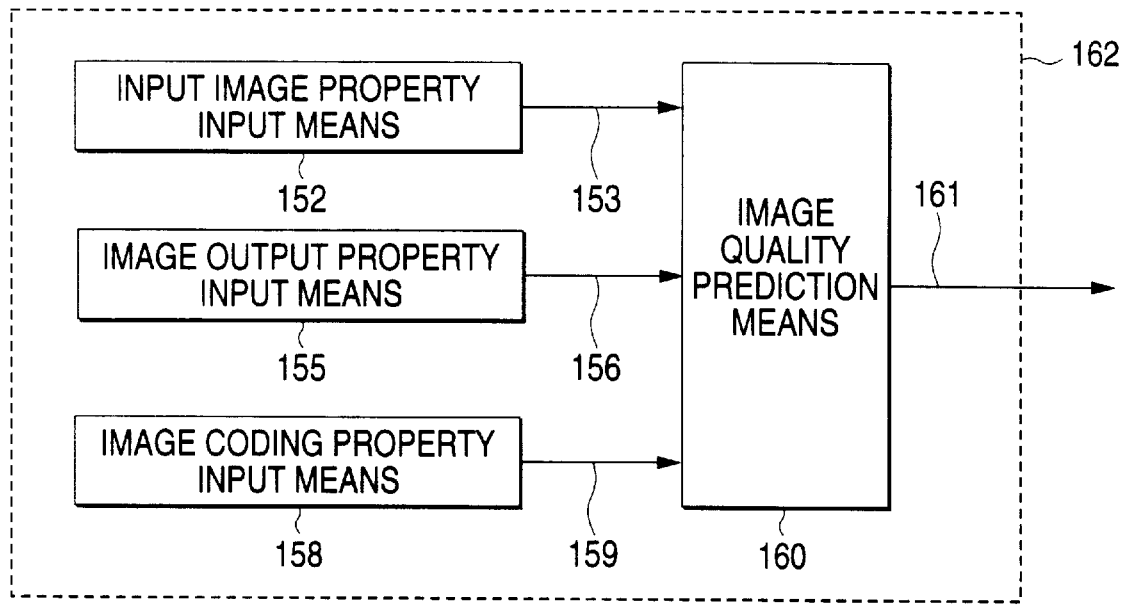
FIG. 13 is a block diagram to show the configuration of item-by-item image quality prediction means of the seventh embodiment of the invention.

Next, an image quality prediction system of a seventh embodiment of the invention will be discussed. FIG. 12 shows the image quality prediction system of the seventh embodiment as a whole. FIG. 13 shows the configuration of item-by-item image quality prediction means 162. In FIGS. 12 and 13, numeral 152 is input image property input means, numeral 153 is an input image property, numeral 155 is image output property input means, numeral 156 is an image output property, numeral 158 is image coding property input means, numeral 159 is an image coding property, numeral 160 is image quality prediction means, numeral 161 is predicted item-by-item image quality, numeral 162 is item-by-item image quality prediction means, numeral 163 is total image quality prediction means, and numeral 164 is predicted image quality.

Figure 14:
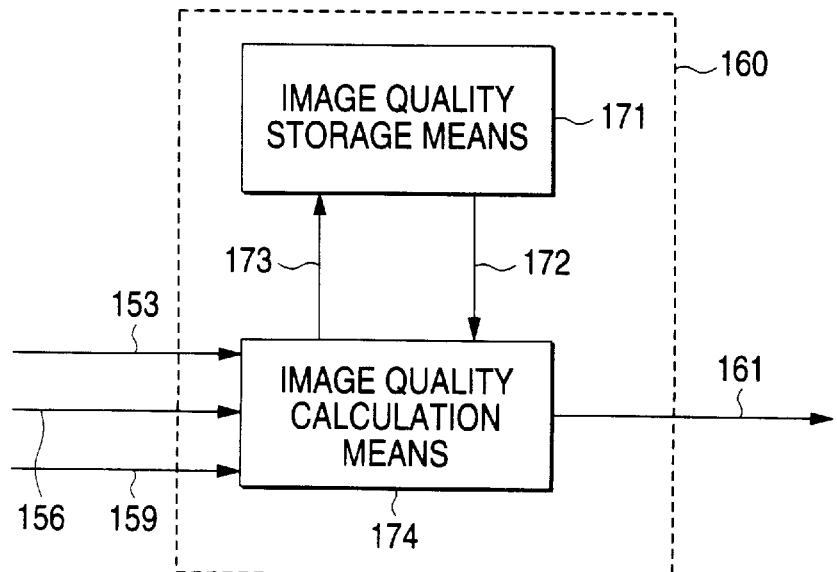
FIG. 14 is a block diagram to show the configuration of image quality prediction means in FIG. 13.

FIG. 14 shows the configuration of the image quality prediction means. In the figure, numeral 171 is image quality storage means, numeral 172 is stored image quality, numeral 173 is an address in the image quality storage means, and numeral 174 is image quality calculation means.

Figure 15:
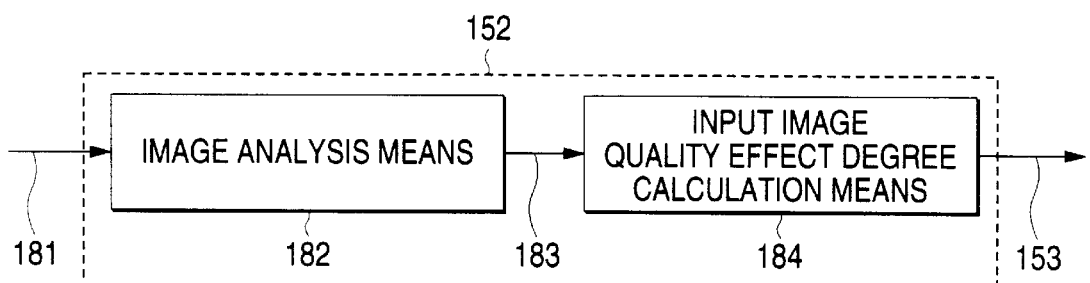
FIG. 15 is a block diagram to show the configuration of input image property input means in FIG. 13.

FIG. 15 shows the configuration of the input image property input means 152. In the figure, numeral 153 is an input image property, numeral 181 is an input image, numeral 182 is image analysis means, numeral 183 is an input image analysis result, and numeral 184 is input image quality effect degree calculation means.

Figure 16:
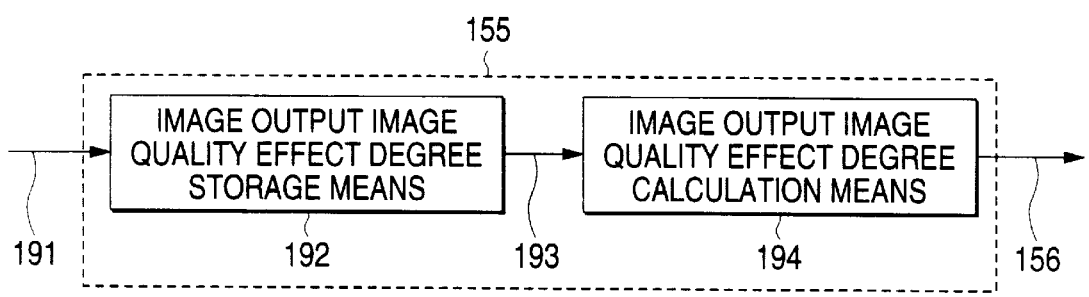
FIG. 16 is a block diagram to show the configuration of image output property input means in FIG. 13.

FIG. 16 shows the configuration of the image output property input means 155. In the figure, numeral 156 is an image output property, numeral 191 is an image output device state, numeral 192 is image output image quality effect degree storage means, numeral 193 is an image output image quality effect degree, and numeral 194 is image output image quality effect degree calculation means.

Figure 17:
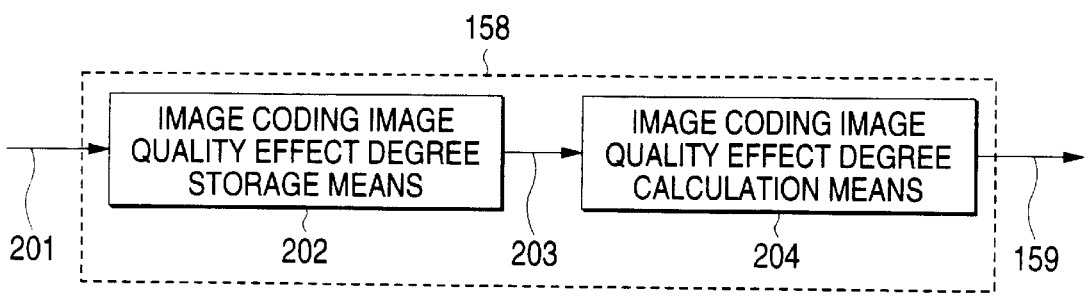
FIG. 17 is a block diagram to show the configuration of image coding property input means in FIG. 13.

FIG. 17 shows the configuration of the image coding property input means 158. In the figure, numeral 159 is image coding property, numeral 201 is an image coding parameter state, numeral 202 is image coding image quality effect degree storage means, numeral 203 is an image coding image quality effect degree, and numeral 204 is image coding image quality effect degree calculation means.

Referring to FIG. 13, the input image property 153 is input through the input image property input means 152 to the image quality prediction means 160. The image output property 156 is input through the image output property input means 155 to the image quality prediction means 160. Further, the image coding property 159 is input through the image coding property input means 158 to the image quality prediction means 160. The image quality prediction means 160 predicts image quality by image quality degradation item from the input image property 153, the image output property 156, and the image coding property 159 and outputs the item-by-item image quality 161. The total image quality prediction means 163 predicts total predicted image quality 164 based on one or more item-by-item image qualities.

In the input image property input means 152 in FIG. 15, the image analysis means 182 analyzes the input image 181 and enters the input image analysis result 183 in the input image quality effect degree calculation means 184, which then outputs the input image quality effect degree as the input image property 153.

In the image output property input means 155 in FIG. 16, the image output image quality effect degree storage means 192 enters the image output image quality effect degree 193 in the image output image quality effect degree calculation means 194 once or more than once in accordance with the input image output device state, and the image output image quality effect degree calculation means 194 outputs a new calculated image output image quality effect degree from the one or more image output image quality effect degrees as the image output property 156.

In the image coding property input means 158 in FIG. 17, the image coding image quality effect degree storage means 202 enters the image coding image quality effect degree 203 in the image coding image quality effect degree calculation means 204 once or more than once in accordance with the input image coding parameter state 201, and the image coding image quality effect degree calculation means 204 outputs a new calculated image coding image quality effect degree from one or more image coding image quality effect degrees as the image coding property 159.

In the image quality prediction means 160 in FIG. 14, the image quality calculation means 174 calculates one or more addresses 173 seeming to be the nearest from the input image property 153, the image output property 156, and the image coding property 159 and sends the one or more calculated addresses to the image quality storage means 171, which then returns the image quality 172 to the image quality calculation means 174, which then calculates the image quality 161 based on the received image quality 172.

Embodiment 8

Figure 18:
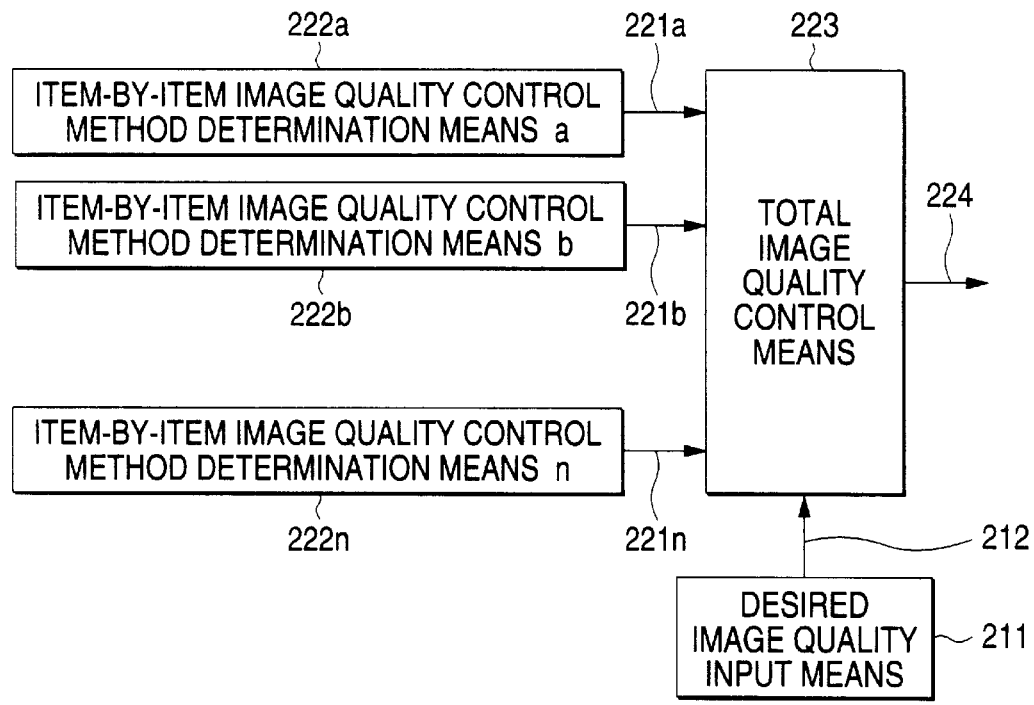
FIG. 18 is a block diagram to show the configuration of an eighth embodiment of the invention.
Figure 19:
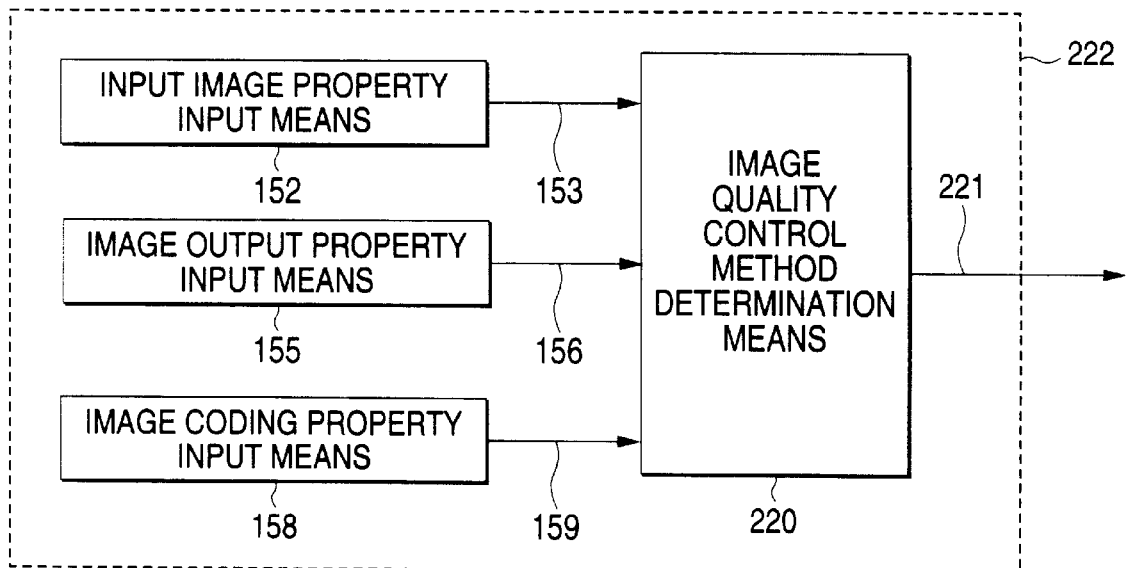
FIG. 19 is a block diagram to show the configuration of item-by-item image quality control method determination means of the eighth embodiment of the invention.

Next, an image quality control system of an eighth embodiment of the invention will be discussed. FIG. 18 shows the image quality control system of the eighth embodiment as a whole. FIG. 19 shows the configuration of item-by-item image quality control method determination means 222. In FIGS. 18 and 19, numeral 152 is input image property input means, numeral 153 is an input image property, numeral 155 is image output property input means, numeral 156 is an image output property, numeral 158 is image coding property input means, numeral 159 is an image coding property, numeral 211 is desired image quality input means, numeral 212 is desired image quality, numeral 220 is image quality control method determination means, numeral 221 is an item-by-item image quality control method, numeral 222 is item-by-item image quality control method determination means, numeral 223 is total image quality control means, and numeral 224 is a coding parameter.

Figure 20:
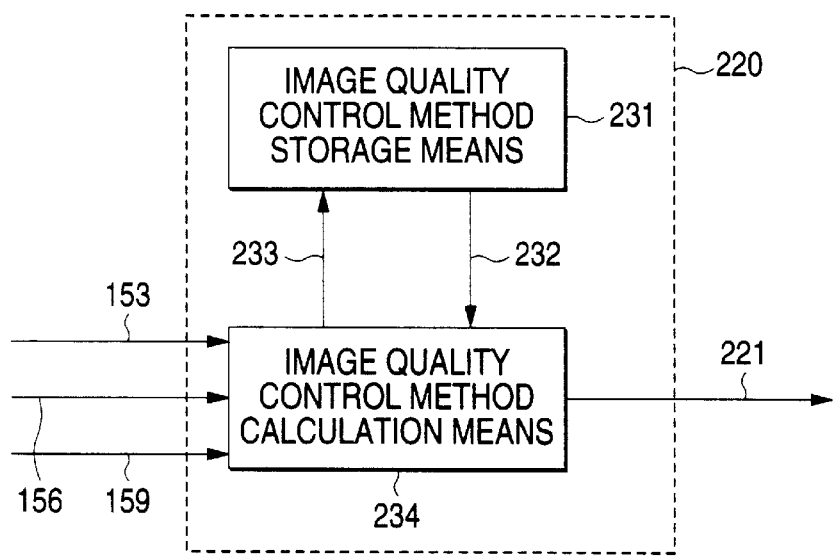
FIG. 20 is a block diagram to show the configuration of image quality control method determination means in FIG. 19.

FIG. 20 shows the configuration of the image quality control method determination means 220. In the figure, numeral 231 is image quality control method storage means, numeral 232 is a stored image quality control method, numeral 233 is an address in the image quality control method storage means 232, and numeral 234 is image quality control method calculation means.

Figure 21:
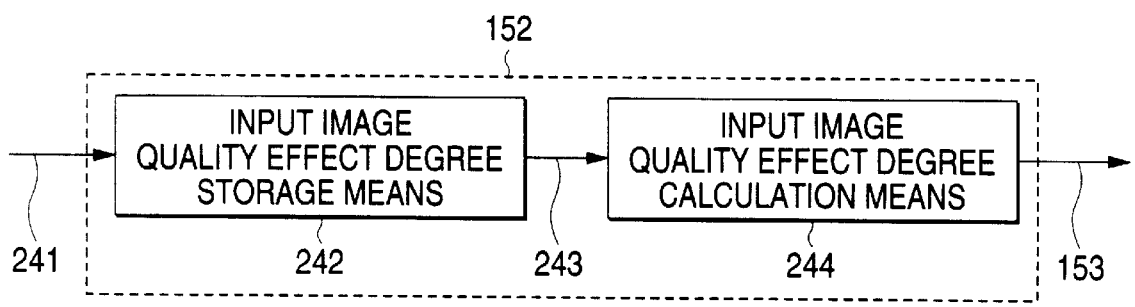
FIG. 21 is a block diagram to show the configuration of input image property input means in FIG. 19.

FIG. 21 shows the configuration of the input image property input means 152. In the figure, numeral 152 is input image property input means, numeral 153 is an input image property, numeral 241 is an image input device state, numeral 242 is input image quality effect degree storage means, numeral 243 is an input image quality effect degree, and numeral 244 is input image quality effect degree calculation means.

Referring to FIGS. 18 and 19, the input image property 153 is input through the input image property input means 152 to the image quality control method determination means 220. The image output property 156 is input through the image output property input means 155 to the image quality control method determination means 220. Further, the image coding property 159 is input through the image coding property input means 158 to the image quality control method determination means 220. The image quality control method determination means 220 determines an image quality control method by image quality degradation item from the input image property 153, the image output property 156, and the image coding property 159 and outputs the item-by-item image quality control method 221. The total image quality control means 223 determines a coding parameter satisfying the desired image quality in each item-by-item image quality from each item-by-item image quality control method and desired image quality 212 and further determines a coding parameter 164 satisfying the total image quality.

In the input image property input means 152 in FIG. 21, the input image quality effect degree storage means 242 enters the input image quality effect degree 243 in the input image quality effect degree calculation means 244 once or more than once in accordance with the input image input device state 241, and the input image quality effect degree calculation means 244 outputs a new calculated input image quality effect degree from the one or more input image quality effect degrees as the image output property 156.

The image output property input means 155 and the image coding property input means 158 are similar to those of the seventh embodiment.

In the image quality control method determination means 220 in FIG. 20, the image quality control method calculation means 234 calculates one or more addresses 233 seeming to be the nearest from the input image property 153, the image output property 156, and the image coding property 159 and sends the one or more calculated addresses to the image quality control method storage means 231, which then returns the image quality control method 232 to the image quality control method calculation means 234, which then determines the image quality control method 221 based on the received image quality control method 232.

Embodiment 9

Next, a ninth embodiment of the invention will be discussed. The ninth embodiment uses JPEG as a coding system and analyzes an input image for each part for checking the property of the input image. Two image quality degradation items of edge business and blur are provided. An example will be discussed wherein easy occurrence (effect degree) of degradation for each of the edge business and blur is mapped in one dimension for each of an output machine (printer), an image coding system (quantization matrix), and an input image property. The edge business refers to jaggy distortion resulting from widening or narrowing the edge width. The blur refers to distortion viewed as a blur resulting from suppressing high-frequency signals.

The ninth embodiment is characterized by the fact that when the printer type and a quantization matrix are input for one input block, the image quality when the input block is output to the printer is predicted.

Figure 22:
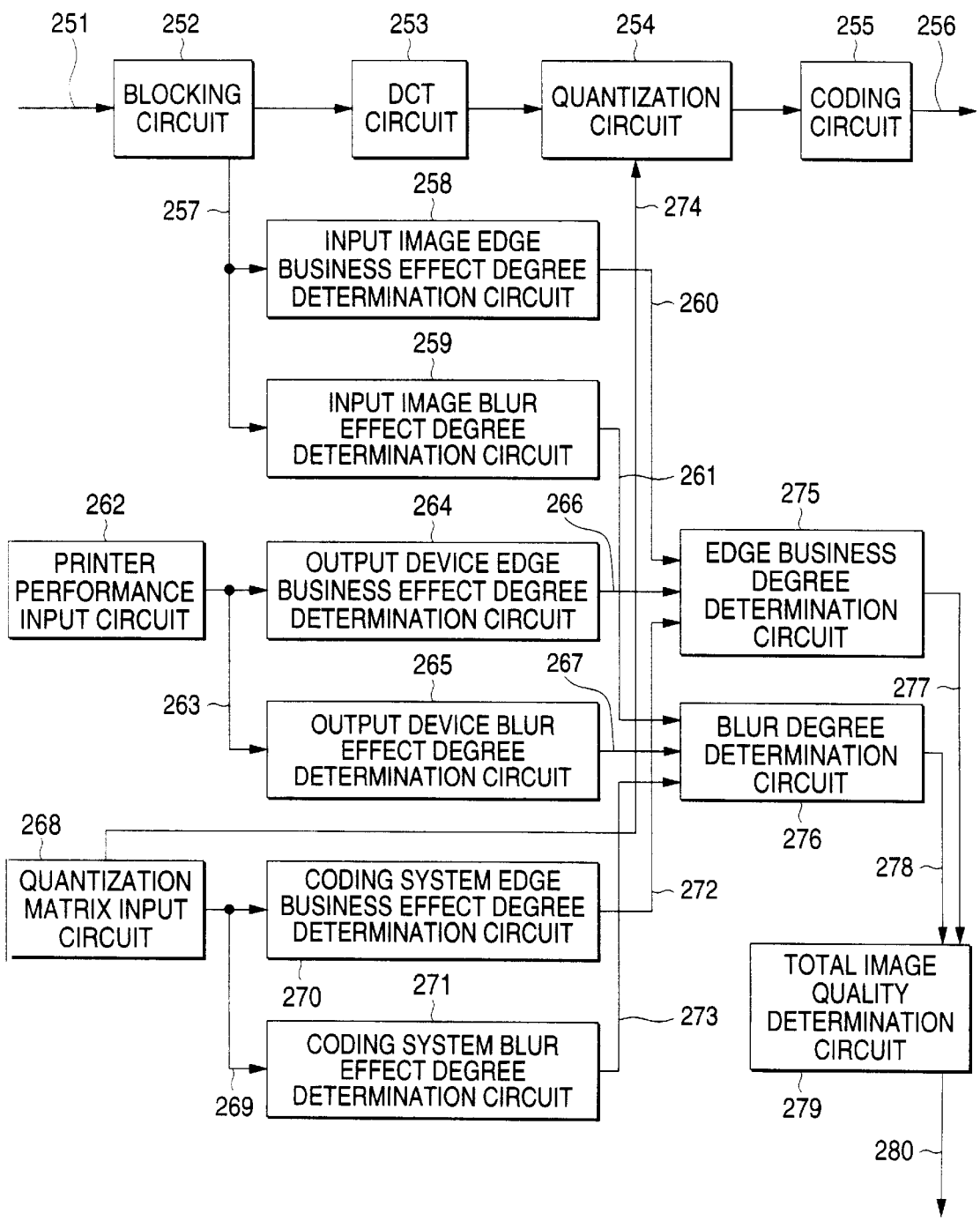
FIG. 22 is a block diagram to show the configuration of a ninth embodiment of the invention.

FIG. 22 shows the ninth embodiment as a whole. In the figure, numeral 251 is an input image, numeral 252 is a blocking circuit for blocking an input image, numeral 253 is a DCT circuit for discrete cosine transforming the image blocks, numeral 254 is a quantization circuit for quantizing a DCT coefficient, numeral 255 is a coding circuit for assigning a code to the quantized DTC coefficient, and numeral 256 is code. Further, numeral 257 is block image provided by blocking input image, numeral 258 is an input image edge business effect degree determination circuit for determining the edge business effect degree of the block image 257, numeral 259 is an input image blur effect degree determination circuit for determining the blur effect degree of the block image 257, numeral 260 is an input image edge business effect degree, numeral 261 is an input image blur effect degree, numeral 262 is a printer performance input circuit for inputting printer performance, numeral 263 is printer performance, numeral 264 is an output device edge business effect degree determination circuit for determining an output device edge business effect degree, numeral 265 is an output device blur effect degree determination circuit for determining an output device blur effect degree, numeral 266 is an output device edge business effect degree, numeral 267 is an output device blur effect degree, numeral 268 is a quantization matrix input circuit for entering a quantization matrix in the quantization circuit 254, numeral 269 is a quantization matrix, numeral 270 is a coding system edge business effect degree determination circuit for determining the effect degree of a coding system on edge business, numeral 271 is a coding system blur effect degree determination circuit for determining the effect degree of a coding system on blur, numeral 272 is a coding system edge business effect degree, numeral 273 is a coding system blur effect degree, numeral 274 is a quantization matrix, numeral 275 is an edge business degree determination circuit for determining the amount of edge business, one of image quality degradation items, numeral 276 is a blur degree determination circuit for determining the amount of a blur, one of image quality degradation items, numeral 277 is an edge business degree, numeral 278 is a blur degree, numeral 279 is a total image quality determination circuit for determining total image quality from the edge business degree and the blur degree, and numeral 280 is total image quality.

Next, the operation of the ninth embodiment will be discussed. In FIG. 22, an input image is coded by the operation similar to JPEG. That is, the blocking circuit 252 divides the input image 251 into 8×8 blocks and the DCT circuit 253 discrete cosine transforms the blocks and outputs a DCT coefficient. The quantization circuit 254 quantizes the DCT coefficient and the coding circuit 255 assigns a code to the quantization result and outputs the code 256. The quantization matrix used with the quantization circuit 254 is input through the quantization matrix input circuit 268.

Further, in FIG. 22, the block image 257 is input to the input image edge business effect degree determination circuit 258 and the input image blur effect degree determination circuit 259. The operation of the input image edge business effect degree determination circuit 258 and the input image blur effect degree determination circuit 259 will be discussed below.

Figure 23:
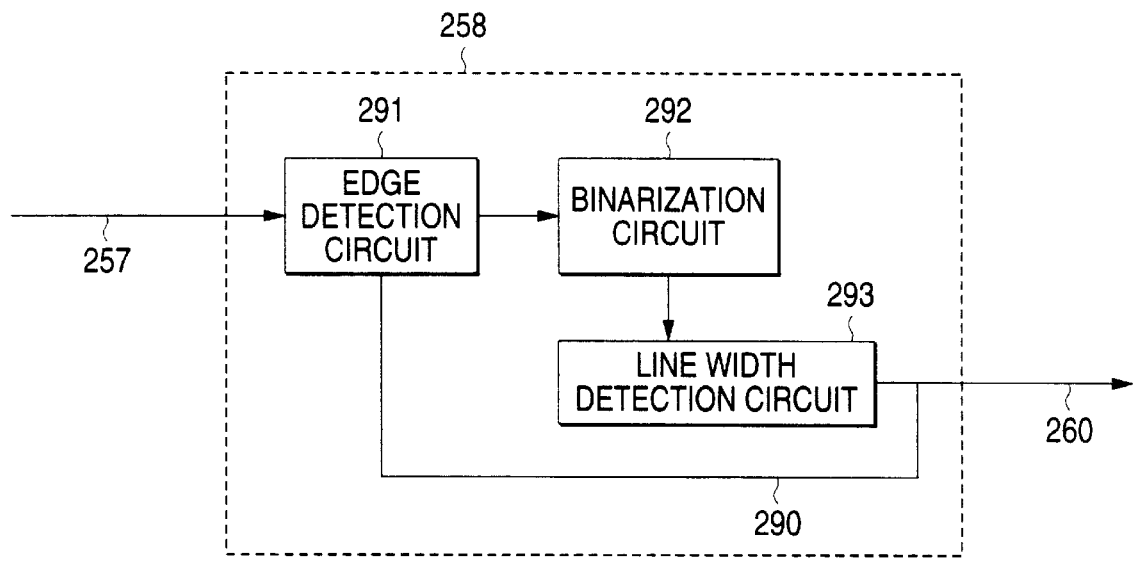
FIG. 23 is a block diagram to show the configuration of an input image edge business effect degree determination circuit of the ninth embodiment of the invention.
Figure 24:
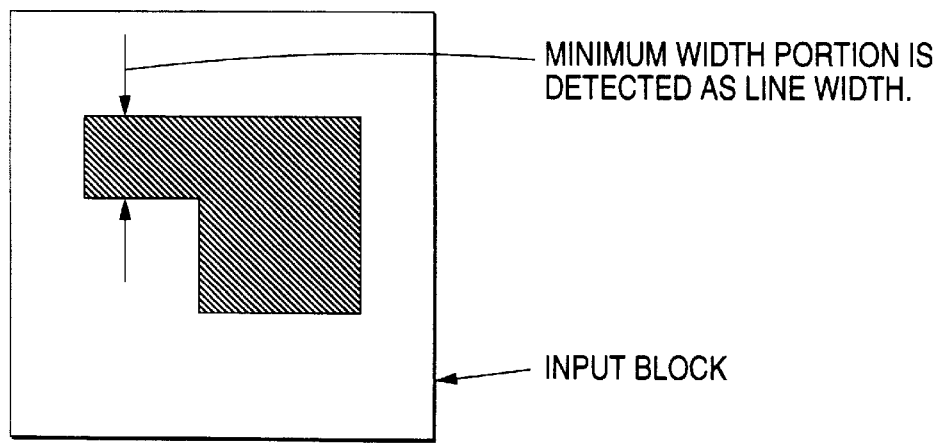
FIG. 24 is an illustration to explain a line width detection circuit in FIG. 23.

The input image edge business effect degree determination circuit 258 determines how much easily the input block image produces edge business. The operation of the input image edge business effect degree determination circuit 258 will be discussed with reference to FIG. 23. In the figure, numeral 291 is an edge detection circuit, numeral 292 is a binarization circuit, and numeral 293 is a line width detection circuit. The edge detection circuit 291 determines whether or not the input block 257 contains an edge. If an edge is contained, the edge detection circuit 291 enters the input block 257 in the binarization circuit 292; if an edge is not contained, the edge detection circuit 291 outputs the edge business effect degree 260 as the lowest value. If a signal of the input block 257 is greater than a predetermined threshold value, the binarization circuit 292 sets the signal to 1; if a signal of the input block 257 is less than the predetermined threshold value, the binarization circuit 292 sets the signal to 0. As shown in FIG. 24, the line width detection circuit 292 detects the minimum width among pixels set to 1 in the longitudinal, lateral, and diagonal directions as the line width, and outputs the line width as the edge business effect degree 260.

Likewise, the input image blur effect degree determination circuit 259 also detects the line width in the input block 257 and outputs the line width as the input image blur effect degree 261.

Here, the input image edge business effect degree determination circuit 258 and the input image blur effect degree determination circuit 259 are the same in operation, but may not necessarily be the same in operation.

Further, we continues to discuss the operation in FIG. 22. In the figure, printer performance used for image output is input through the printer performance input circuit 262. Here, the resolution and the number of gray levels of a printer are input.

Figures 27, 28:
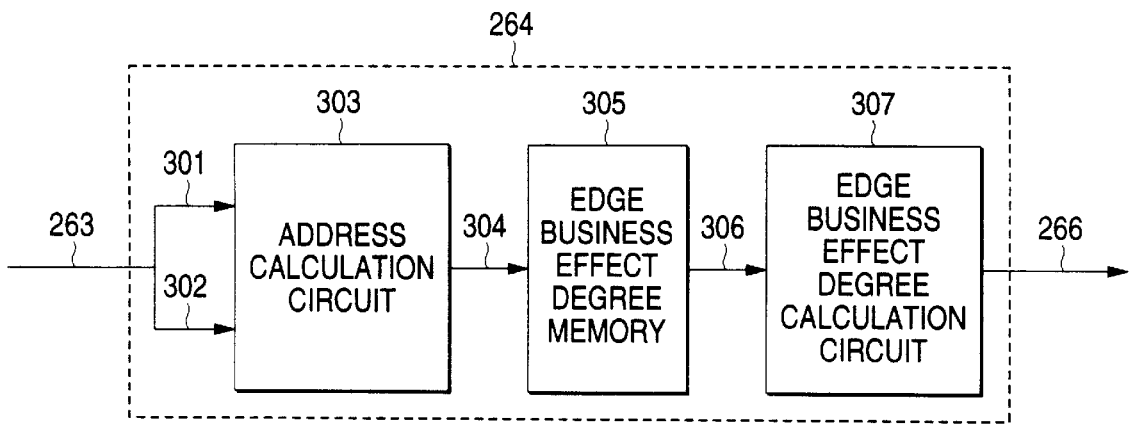
FIG. 27 is an illustration to explain an output device edge business effect degree determination circuit of the ninth embodiment of the invention.
FIG. 28 is a block diagram to show the configuration of the output device edge business effect degree determination circuit of the ninth embodiment of the invention.

The output device edge business effect degree determination circuit 264 determines how much easily edge business occurs visually for the input resolution and the input number of gray levels of the printer, and outputs the determination as the output device edge business effect degree 266. Subjective evaluation is previously executed on a standard image for a plurality of types of printers different in resolution or number of grays levels. The subjective evaluation value matching the resolution and the number of gray levels is used as the output device edge business effect degree 266. For example, an MOS evaluation value can be used for the subjective evaluation value. A table, for example, as shown in FIG. 27, is provided wherein if the resolution and the number of gray levels are determined, the output device edge business effect degree 266 is found. Then, the resolution and the number of gray levels of a new printer are input, whereby the output device edge business effect degree can be found.

The operation of the output device edge business effect degree determination circuit 264 will be discussed with reference to FIG. 28. In the figure, numeral 301 is resolution information of a printer, numeral 302 is number-of-gray-level information of a printer, numeral 303 is an address calculation circuit, numeral 304 is an address, numeral 305 is an edge business effect degree memory, numeral 306 is an edge business effect degree, and numeral 307 is an edge business effect degree calculation circuit. The address calculation circuit 303 calculates and outputs the address 304 of the edge business effect degree memory 305 from the resolution information of printer 301 and the number-of-gray-level information of printer 302 input as the printer performance 263. The edge business effect degree memory 305 outputs the edge business effect degree 306 in accordance with the value of the address 304. The edge business effect degree calculation circuit 307 outputs the output device edge business effect degree 266 from the value of the edge business effect degree 306. If the address calculation circuit 303 can uniquely determine the address 304 from the resolution information of printer 301 and the number-of-gray-level information of printer 302, the edge business effect degree calculation circuit 307 does not calculate the edge business effect degree and outputs the edge business effect degree 306 output from the edge business effect degree memory 305 intact as the output device edge business effect degree 266. If the address calculation circuit 303 cannot uniquely determine the address 304, the edge business effect degree calculation circuit 307 outputs the interpolation and calculation result of the values of the edge business effect degrees 306 output from the edge business effect degree memory 305 in accordance with the addresses 304 as the output device edge business effect degree 266.

Referring again to FIG. 22, likewise, the output device blur effect degree determination circuit 265 determines how much easily a blur occurs visually for the input resolution and the input number of gray levels of the printer, and outputs the determination as the output device blur effect degree 267. Subjective evaluation is previously executed on a standard image for a plurality of types of printers different in resolution or number of gray levels. The subjective evaluation value matching the resolution and the number of gray levels is used as the output device blur effect degree. For example, an MOS evaluation value can be used for the subjective evaluation value.

Further, the quantization matrix input circuit 268 enters the quantization matrix 274 in the quantization circuit 254 and the coding system edge business effect degree determination circuit.

The coding system edge business effect degree determination circuit 270 determines how much easily edge business occurs visually for the input quantization matrix, and outputs the determination as the coding system edge business effect degree 272. Subjective evaluation is previously executed on a standard image and a standard print with various quantization matrixes. The subjective evaluation value is used as the coding system edge business effect degree. For example, an MOS evaluation value can be used for the subjective evaluation value.

Figure 29:
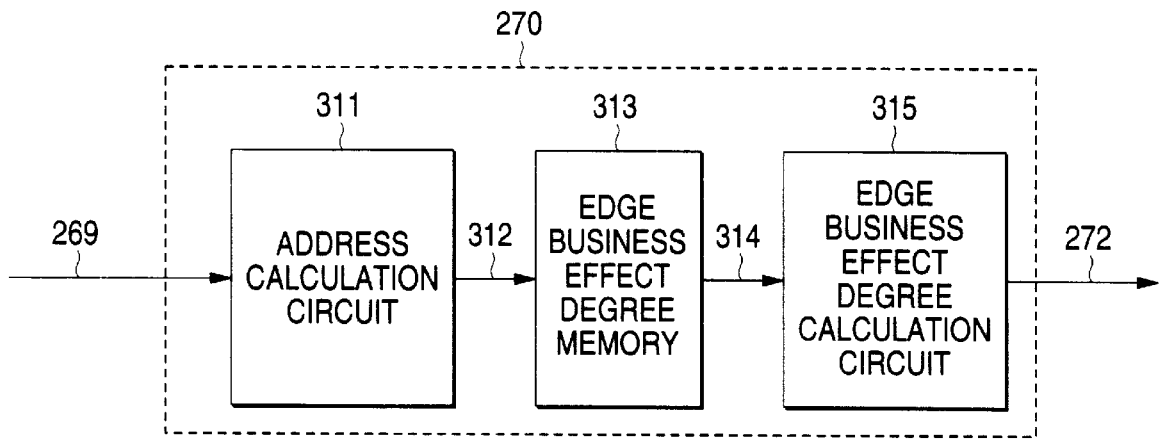
FIG. 29 is a block diagram to show the configuration of a coding system edge business effect degree determination circuit of the ninth embodiment of the invention.

The operation of the coding system edge business effect degree determination circuit 270 will be discussed with reference to FIG. 29. In the figure, numeral 311 is an address calculation circuit, numeral 312 is an address, numeral 313 is an edge business effect degree memory, numeral 314 is an edge business effect degree, and numeral 315 is an edge business effect degree calculation circuit. The address calculation circuit 311 calculates and outputs the address 312 of the edge business effect degree memory 313 from the quantization matrix 269. The edge business effect degree memory 313 outputs the edge business effect degree 314 in accordance with the value of the address 312. The edge business effect degree calculation circuit 315 outputs the coding system edge business effect degree 272 from the value of the edge business effect degree 314. If the address calculation circuit 311 can uniquely determine the address 312 from the quantization matrix 269, the edge business effect degree calculation circuit 315 does not calculate the edge business effect degree and outputs the edge business effect degree 314 output from the edge business effect degree memory 313 intact as the coding system edge business effect degree 272. If the address calculation circuit 311 cannot uniquely determine the address 312, the edge business effect degree calculation circuit 315 outputs the interpolation and calculation result of the values of the edge business effect degrees 314 output from the edge business effect degree memory 313 in accordance with the addresses 312 as the coding system edge business effect degree 272.

Referring again to FIG. 22, the coding system blur effect degree determination circuit 271 determines how much easily a blur occurs visually for the input quantization matrix, and outputs the determination as the coding system blur effect degree 273. Subjective evaluation is previously executed on a standard image and a standard printer with various quantization matrixes. The subjective evaluation value is used as the coding system blur effect degree. For example, an MOS evaluation value can be used for the subjective evaluation value.

Next, the input image edge business effect degree 260, the output device edge business effect degree 266, and the coding system edge business effect degree 272 for the input block 257 are input to the edge business degree determination circuit 275.

Figure 25:
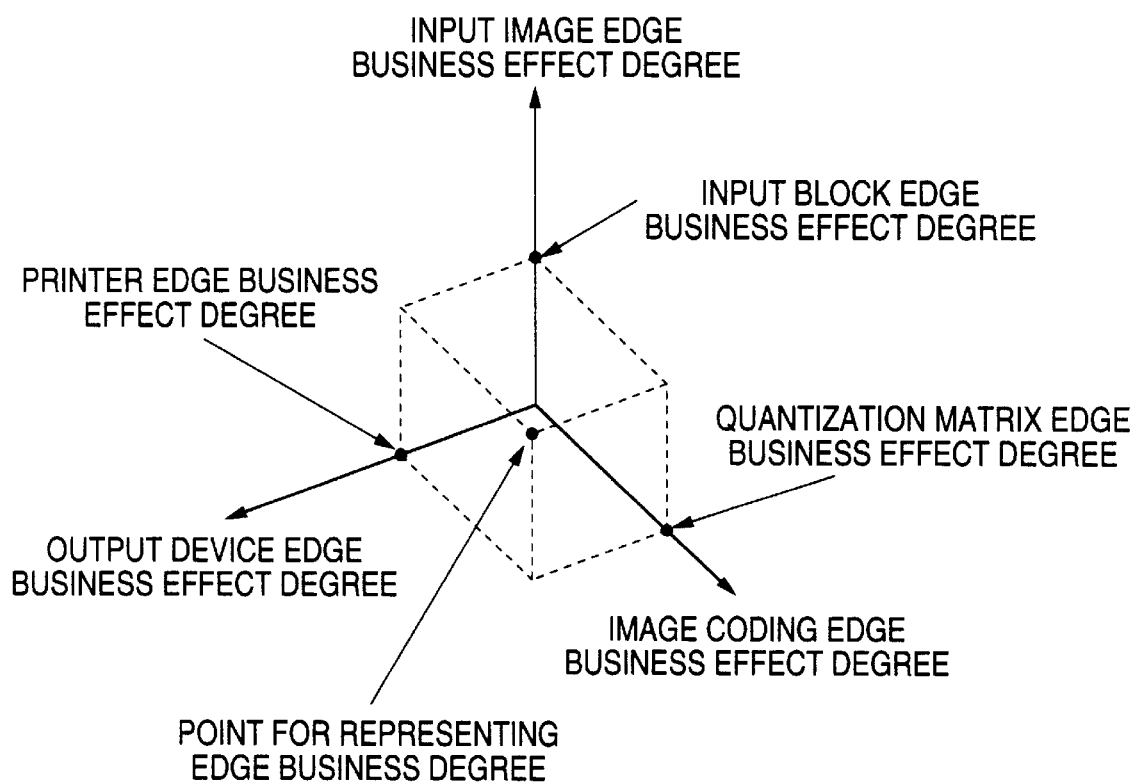
FIG. 25 is an illustration to explain an edge business degree determination circuit of the ninth embodiment of the invention.

The edge business degree determination circuit 275 will be discussed with reference to FIG. 25. As shown here, spatial points consisting of three dimensions of the input image edge business effect degree, the output device edge business effect degree, and the coding system edge business effect degree are specified from the input image edge business effect degree 260, the output device edge business effect degree 266, and the coding system edge business effect degree 272. The points address a memory storing the edge business degrees. The edge business degrees at the points are previously found from a subjective evaluation experiment and are stored at the addresses of the memory. By referencing the memory, the subjective evaluation value of edge business when the input block 257 is coded with a specified quantization matrix and is output on a specified printer is predicted and is output as the edge business degree 277. If the edge business degree at the point is not previously found by experiment, it can be found by linear interpolation of near edge business degrees.

Figure 26:
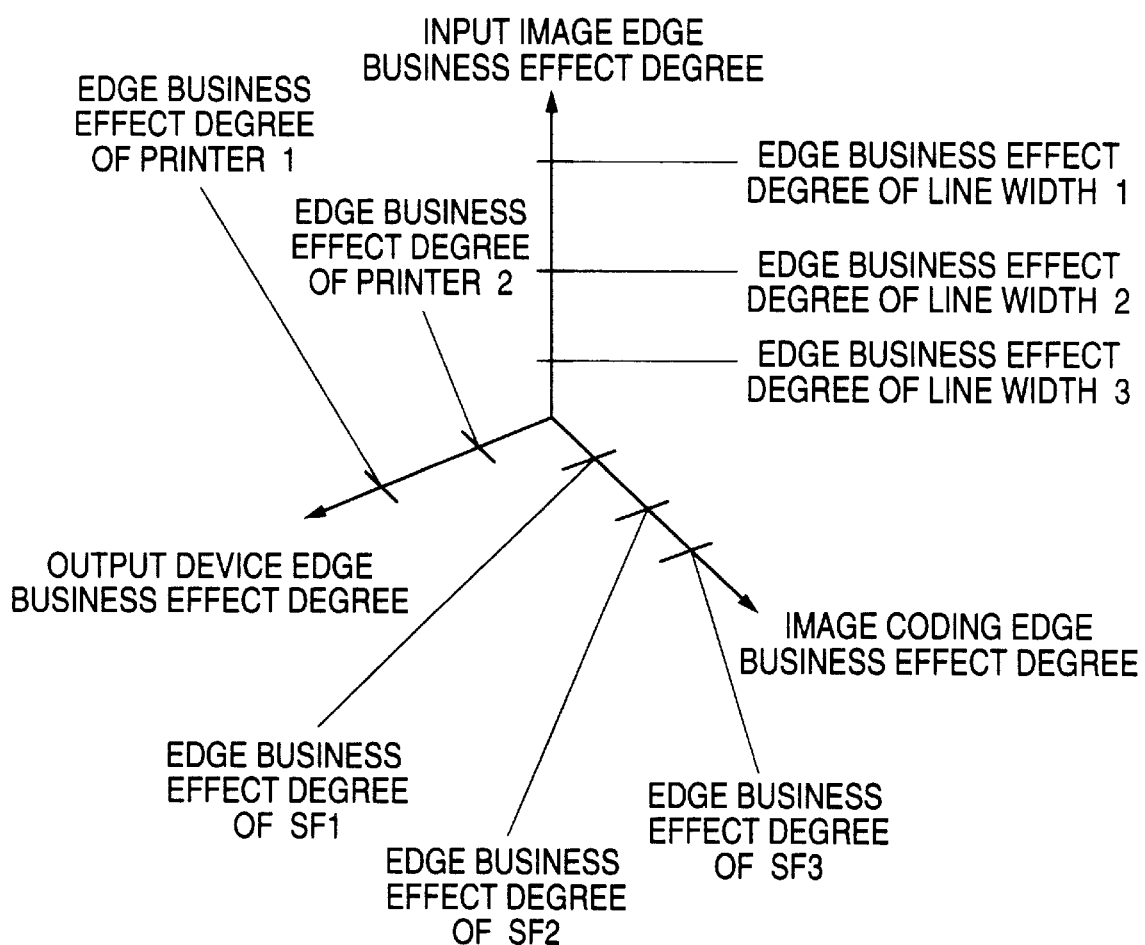
FIG. 26 is an illustration to explain an item-by-item image quality space of the ninth embodiment of the invention.

FIG. 26 shows and Table 1 lists the experiment results of actual measurement of the image quality in item-by-item image quality space.

In FIG. 26, two types of printers (printers 1 and 2) are used as standard printers for measuring image quality. Three types of quantization matrixes (systems 1, 2, and 3) are used as quantization matrixes. Further, three types of input image line widths (line widths 1, 2, and 3) are used as input image edge business effect degrees. The edge business degrees of 18 lattice points of 2×3×3 in total that can be specified with the three axes are found by a subjective evaluation experiment. Table 1 lists the measurement results of the image quality at the lattice points.

To print out on any other printer than the printer 1 or 2, the same method as mapping the printers 1 and 2 on the graph of FIG. 26 is used for mapping on output device edge business effect degree axes of item-by-item image quality space.

The input image line widths are also mapped on input image edge business effect degree axes. Further, to code with a new quantization matrix, mapping is executed on image coding edge business effect degree axes on a similar criterion to that for mapping SF1, SF2, and SF3.

For example, Table 1 is entered in a ROM or RAM as a look-up table and lattice points are related to ROM or RAM addresses, whereby the table can be referenced later.

Figure 30:
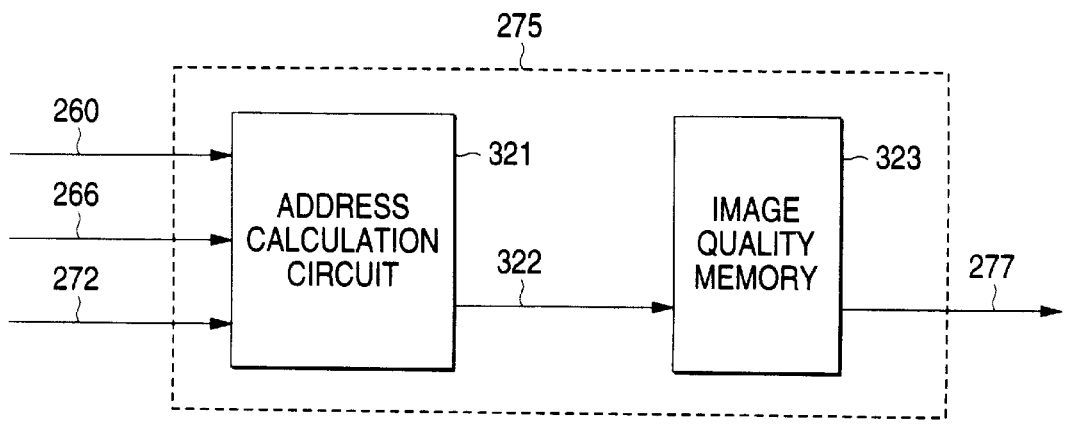
FIG. 30 is a block diagram to show the configuration of the edge business degree determination circuit of the ninth embodiment of the invention.

FIG. 30 is a block diagram of the edge business degree determination circuit. In the figure, numeral 321 is an address calculation circuit, numeral 322 is an address, and numeral 323 is an image quality memory. The image quality contents in Table 1 are previously stored in the image quality memory 323. Assume that the printer number given as an output device edge business effect degree is P, that the line width given as an input image edge business effect degree is L, and that the quantization matrix number given as a coding system edge business effect degree is Q. At this time, the address for each number of the image quality memory 323 can be defined as P×9+L×3+Q, for example. The image quality amounts in Table 1 are stored at the addresses.

In FIG. 30, the input image edge business effect degree 260, the output device edge business effect degree 266, and the coding system edge business effect degree 272 are input to the address calculation circuit 321, which then calculates the address 322 according to the same calculation technique as when stored in the image quality memory 323 and sends the address 322 to the image quality memory 323, which then outputs the memory space contents addressed by the address 322 as the edge business degree 277.

Thus, points in the item-by-item evaluation space of edge business for new printers, new input images, and new quantization matrixes can be found. Since the image quality is already found at the 18 points listed above, if the image quality at a new point is not found, the linear sum of the image qualities at several near points already found is used as the edge business degree for the new printer, the new input image, and the new quantization matrix.

TABLE 1

Edge business image quality space experiment results

|  | Line width 1 | | | Line width 2 | | | Line width 3 | | |
| --- | --- | --- | --- | --- | --- | --- | --- | --- | --- |
|  | System 1 | System 2 | System 3 | System 1 | System 2 | System 3 | System 1 | System 2 | System 3 |
| Printer 1 | 5.000 | 4.143 | 1.286 | 4.857 | 4.286 | 2.286 | 4.714 | 4.714 | 2.857 |
| Printer 2 | 4.857 | 2.857 | 1.143 | 5.000 | 3.429 | 1.857 | 5.000 | 3.857 | 2.143 |

For example, assume that the edge business effect degree of printer 1 is A1, that the edge business effect degree of printer 2 is A2, that the edge business effect degree of line width 1 is B1, the edge business effect degree of line width 2 is B2, that the edge business effect degree of line width 3 is B3, that the edge business effect degree of system 1 is C1, that the edge business effect degree of system 2 is C2, and that the edge business effect degree of system 3 is C3. Table 1 lists the image qualities when input, output, and image coding are performed for each edge business effect degree. Assume that the measurement result of the edge business effect degree of a new printer is (A1+A2)/2 and that the edge business effect degree of new output is B1. To code with the system 1, it is predicted that the image quality is an intermediate value of the element of line width 1, system 1, printer 1 (5.000) and the element of line width 1, system 1, printer 2 (4.857) in Table 1. Then, assume that the measurement result of the edge business effect degree of the new printer is (A1+A2)/2 and that the edge business effect degree of new output is B1. To code with the system 1, it can be predicted that the image quality is (5.000+4.857)/2=4.9285.

If the image quality at a new point is not found, the image quality at the nearest point already found is used as the edge business degree for new printer, new input image, and new quantization matrix. In this case, the address calculation circuit 321 in FIG. 30 finds the nearest lattice point.

Likewise, the blur degree in item-by-item image quality space of blur can be found by subjective evaluation. Table 2 lists the experiment results of image quality measurement in the item-by-item image quality space for blur. The blur degree determination circuit 276 operates based on Table 2 and outputs the blur degree 278.

TABLE 2

Blur image quality space experiment results

|  | Line width 1 | | | Line width 2 | | | Line width 3 | | |
| --- | --- | --- | --- | --- | --- | --- | --- | --- | --- |
|  | System 1 | System 2 | System 3 | System 1 | System 2 | System 3 | System 1 | System 2 | System 3 |
| Printer 1 | 4.714 | 4.143 | 2.000 | 4.714 | 4.714 | 2.857 | 4.714 | 4.714 | 3.714 |
| Printer 2 | 4.714 | 3.286 | 1.857 | 4.714 | 3.714 | 2.571 | 4.714 | 4.143 | 2.571 |

Then, the edge business degree 277 and the blur degree 278 are sent to the total image quality determination circuit 279, which then outputs the total image quality 280.

The total image quality determination circuit 279 determines the edge business degree or blur degree, whichever is the larger in degradation, to be the total image quality.

In the embodiment, subjective evaluation when the effect degrees for the image input means or input image portion, the image coding system and coding parameter, and the image output means are determined is previously determined for each image quality degradation item. Then, the effect degree of each image quality degradation item is measured for the image input means or input image portion, the effect degree of each image quality degradation item is measured for the image coding system and coding parameter, and the effect degree of each image quality degradation item is measured for the image output means, whereby the predication value of the subjective evaluation of each image quality degradation item can be found.

Further, the whole image quality evaluation value can be found from the predication value of the subjective evaluation of each image quality degradation item.

Thus, subjective evaluation image quality can be predicted for a combination of an image input device or input image, an image coding system, and an image output device and the image quality of a coded image can be guaranteed.

Embodiment 10

In the ninth embodiment, the total image quality determination circuit 279 determines the edge business degree or blur degree, whichever is the larger in degradation, to be the total image quality, but the invention is not limited to it. In a tenth embodiment of the invention, total image quality S is found as $$S=aA+bB$$ [Expression 1]

where A is the edge business degree and B is the blur degree. The coefficients a and b are previously defined. The tenth embodiment is the same as the ninth embodiment in other components and therefore will not be discussed again.

Embodiment 11

Next, an eleventh embodiment of the invention will be discussed.

Figure 31:
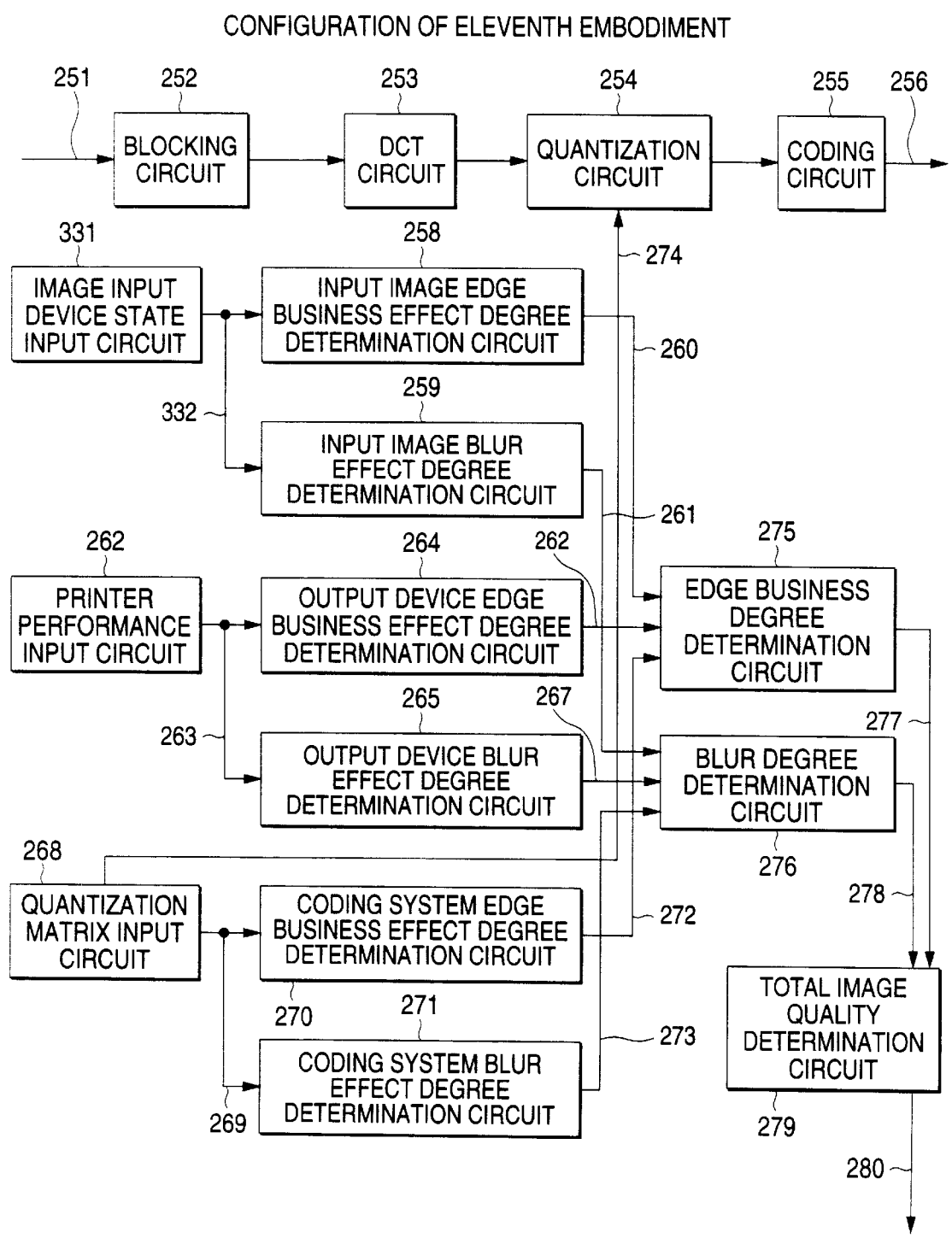
FIG. 31 is a block diagram to show the configuration of an eleventh embodiment of the invention.

In FIG. 31, numeral 331 is an image input device state input circuit and numeral 332 is an image input device state.

FIGS. 31 and 22 differ in that the input image edge business effect degree 260 and the input image blur effect degree 261 are found from an input block in FIG. 22, whereas an input image edge business effect degree 260 and an input image blur effect degree 261 are found from the image input device state output by the image input device state input circuit 331 in FIG. 31.

Figure 32:
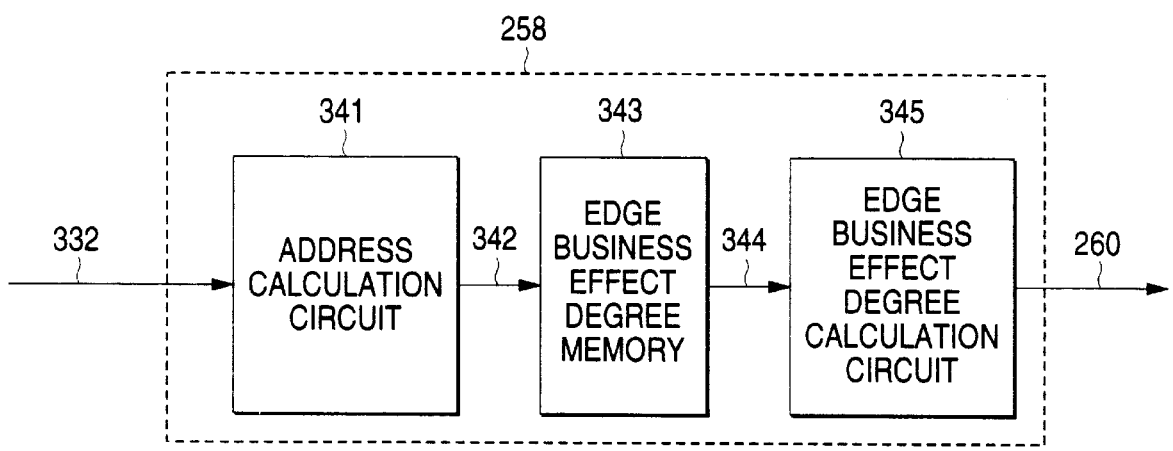
FIG. 32 is a block diagram to show the configuration of an input image edge business effect degree determination circuit of the eleventh embodiment of the invention.

The operation of an input image edge business effect degree determination circuit 258 in FIG. 31 will be discussed with reference to FIG. 32. In FIG. 32, numeral 341 is an address calculation circuit, numeral 342 is an address, numeral 343 is an edge business effect degree memory, numeral 344 is an edge business effect degree, and numeral 345 is an edge business effect degree calculation circuit. The address calculation circuit 341 receives the image input device state 332 and calculates and outputs the address 342 of the edge business effect degree memory 343. The edge business effect degree memory 343 outputs the edge business effect degree 344 in accordance with the value of the address 342. The edge business effect degree calculation circuit 345 outputs the input image edge business effect degree 260 from the value of the edge business effect degree 344. If the address calculation circuit 341 can uniquely determine the address 342 from the image input device state 332, the edge business effect degree calculation circuit 345 does not calculate the edge business effect degree and outputs the edge business effect degree 344 output from the edge business effect degree memory 343 intact as the input image edge business effect degree 260. If the address calculation circuit 341 cannot uniquely determine the address 342, the edge business effect degree calculation circuit 345 outputs the interpolation and calculation result of the values of the edge business effect degrees 344 output from the edge business effect degree memory 343 in accordance with the addresses 342 as the input image edge business effect degree 260.

Embodiment 12

Next, a twelfth embodiment of the invention will be discussed. The ninth to eleventh embodiments are characterized by the fact that when the printer type and a quantization matrix are input for one input block, the image quality when the input block is printed out on the printer is predicted. In contrast, the twelfth embodiment is characterized by the fact that predicted image quality is fed back into a quantization matrix input circuit for providing desired image quality.

Figure 33:
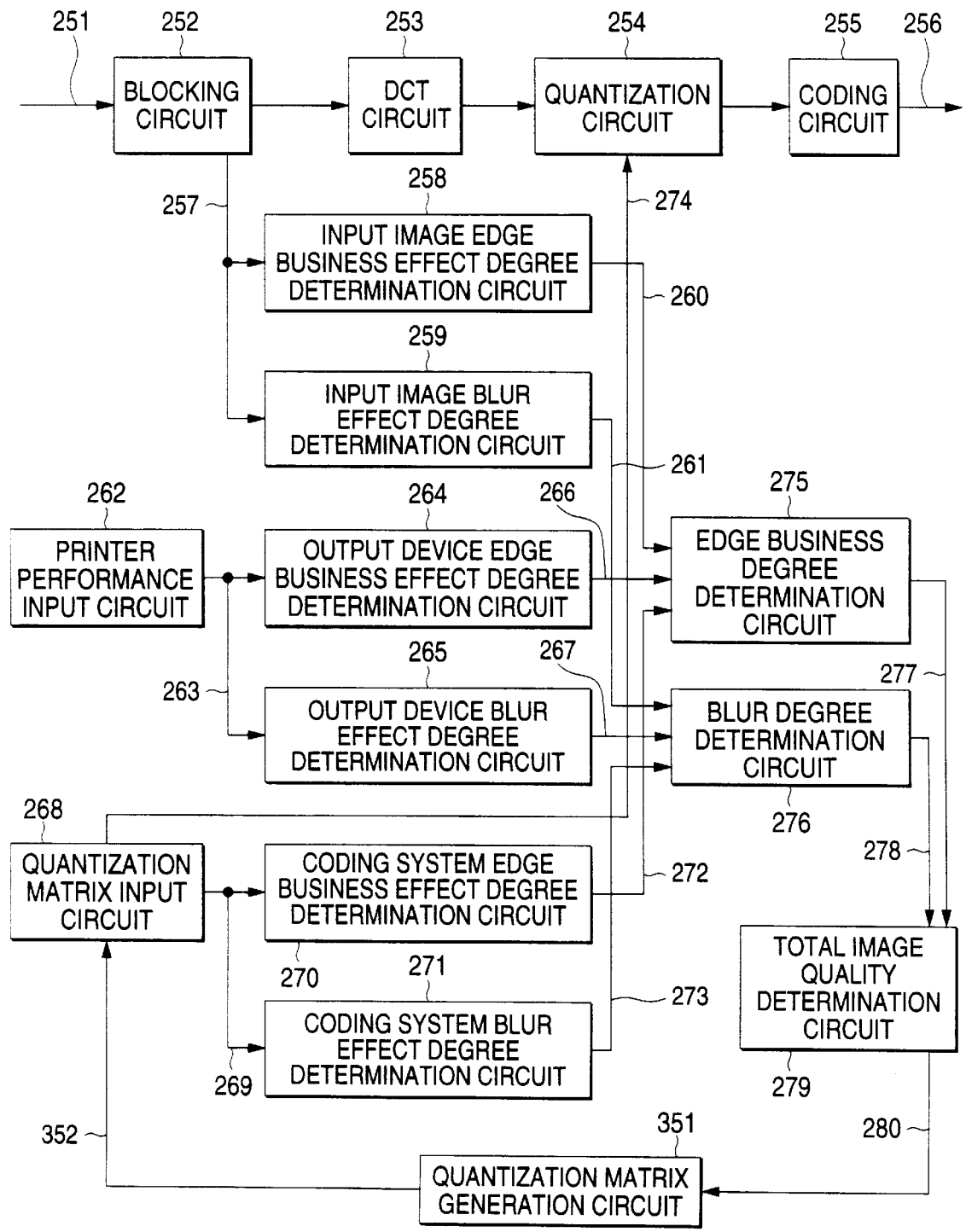
FIG. 33 is a block diagram to show the configuration of a twelfth embodiment of the invention.

FIG. 33 shows the configuration of the twelfth embodiment. In the figure, numeral 351 is a quantization matrix generation circuit and numeral 352 is a quantization matrix.

When an input block 257 is coded, first the quantization matrix generation circuit 351 generates a first quantization matrix and sends the quantization matrix to a quantization matrix input circuit 268. Total image quality 280 predicted with the quantization matrix is input to the quantization matrix generation circuit 351. If the image quality is more than desired image quality, the quantization matrix generation circuit 351 controls the quantization matrix so as to lower the image quality; if the image quality is less than desired image quality, the quantization matrix generation circuit 351 controls the quantization matrix so as to raise the image quality.

Thus, an output image of desired image quality can be provided.

Embodiment 13

Next, a thirteenth embodiment of the invention will be discussed. The embodiments we have discussed are provided for simply finding image quality or for controlling image quality by feedback; the thirteenth embodiment is provided for controlling image quality by feedforward.

In the thirteenth embodiment, a JPEG quantization matrix is broken down into a basic quantization matrix and a scaling factor. Assume that the quantization matrix can be represented by the product of the basic quantization matrix and the scaling factor.

Figure 34:
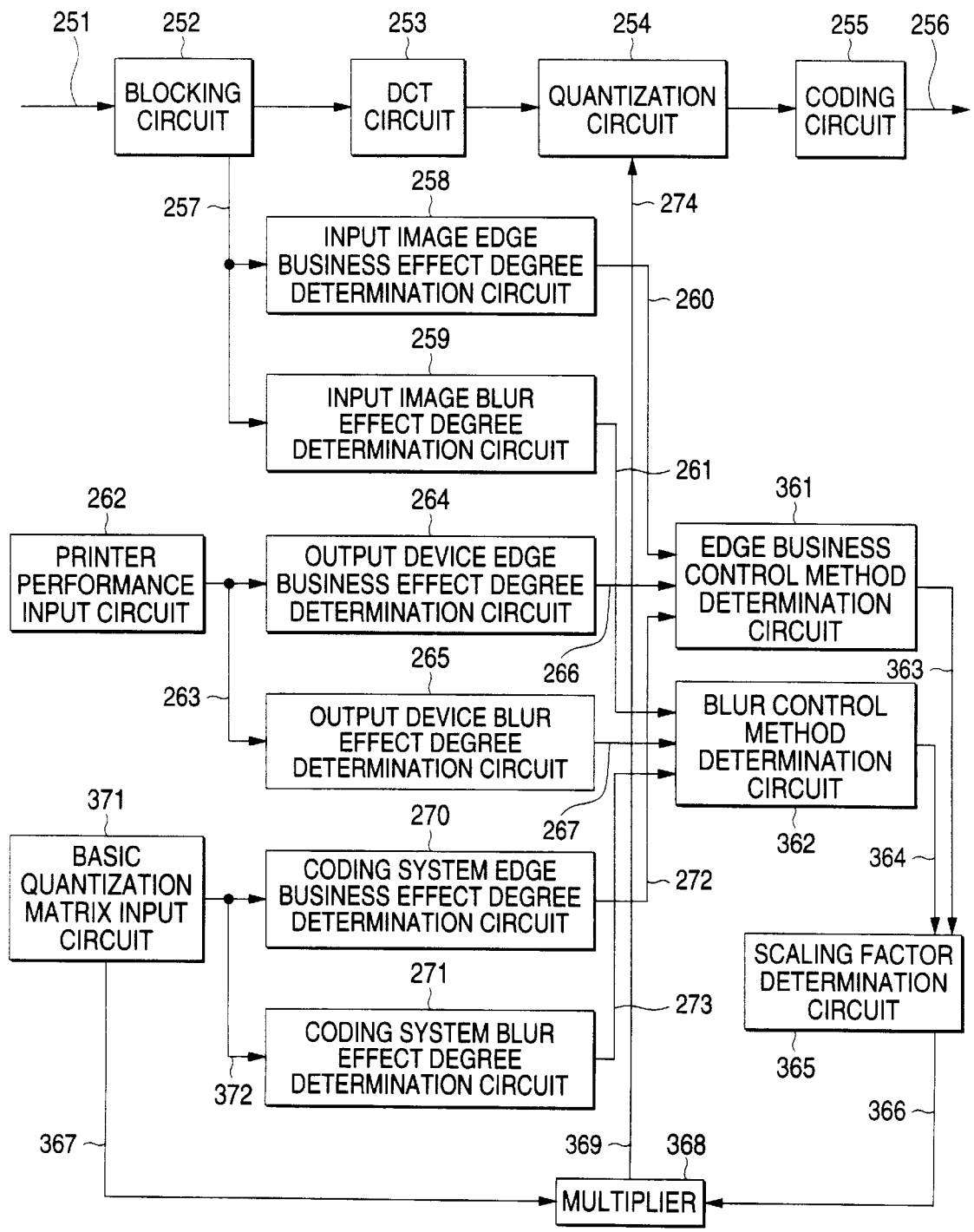
FIG. 34 is a block diagram to show the configuration of a thirteenth embodiment of the invention.

FIG. 34 shows the configuration of the thirteenth embodiment. In the figure, numeral 371 is a basic quantization matrix input circuit, numeral 361 is an edge business control method determination circuit, numeral 362 is a blur control method determination circuit, numeral 363 is an edge business control method, numeral 364 is a blur control method, numeral 365 is a scaling factor determination circuit, numeral 366 is a scaling factor, numerals 367 and 372 are basic quantization matrixes, and numeral 369 is a quantization matrix.

In FIG. 34, the basic quantization matrix input circuit 371 enters the basic quantization matrix 372 in a coding system edge business effect degree determination circuit 270 and a coding system blur effect degree determination circuit 271.

Figure 35:
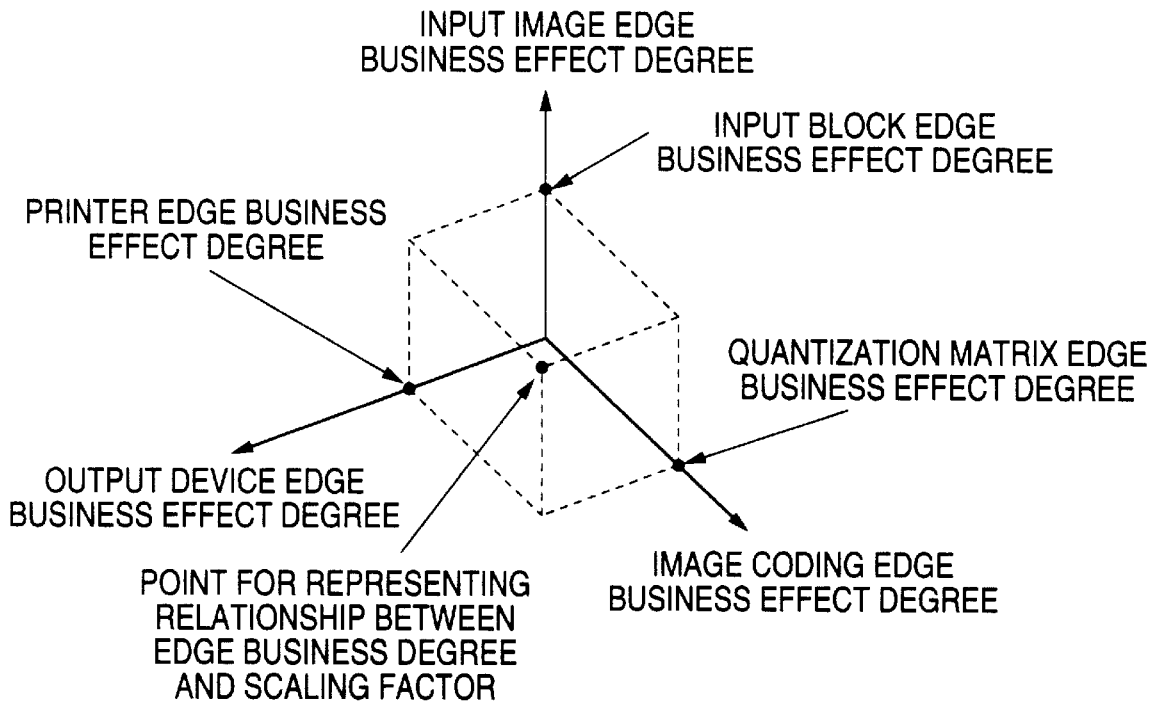
FIG. 35 is an illustration to show an edge business control method determination circuit of the thirteenth embodiment of the invention.
Figure 36:
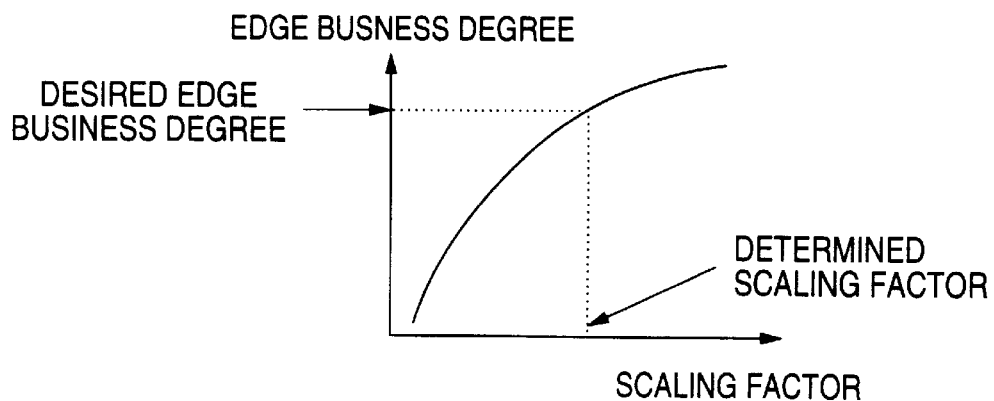
FIG. 36 is an illustration to show the edge business control method determination circuit of the thirteenth embodiment of the invention.

The operation of the edge business control method determination circuit 361 will be discussed with reference to FIG. 35. As shown here, spatial points consisting of three dimensions of the input image edge business effect degree, the output device edge business effect degree, and the coding system edge business effect degree are specified from an input image edge business effect degree 260, an output device edge business effect degree 266, and a coding system edge business effect degree 272. The points address a memory storing the relationship between the edge business degrees and scaling factors. The relationship between the edge business degree and scaling factor is as shown in FIG. 36. The relationship between the edge business degree and scaling factor at each point is previously found from a subjective evaluation experiment and is stored at the address of the memory. By referencing the memory, the edge business control method 363 of the relationship between the subjective evaluation amount of one edge business and scaling factor can be found when the input block 257 is output on a specified printer with a specified basic quantization matrix. If the relationship between the subjective evaluation amount of edge business and the scaling factor at the corresponding point is not previously found, the relationship between the subjective evaluation amount of edge business and the scaling factor at the nearest point already found is used.

Figure 37:
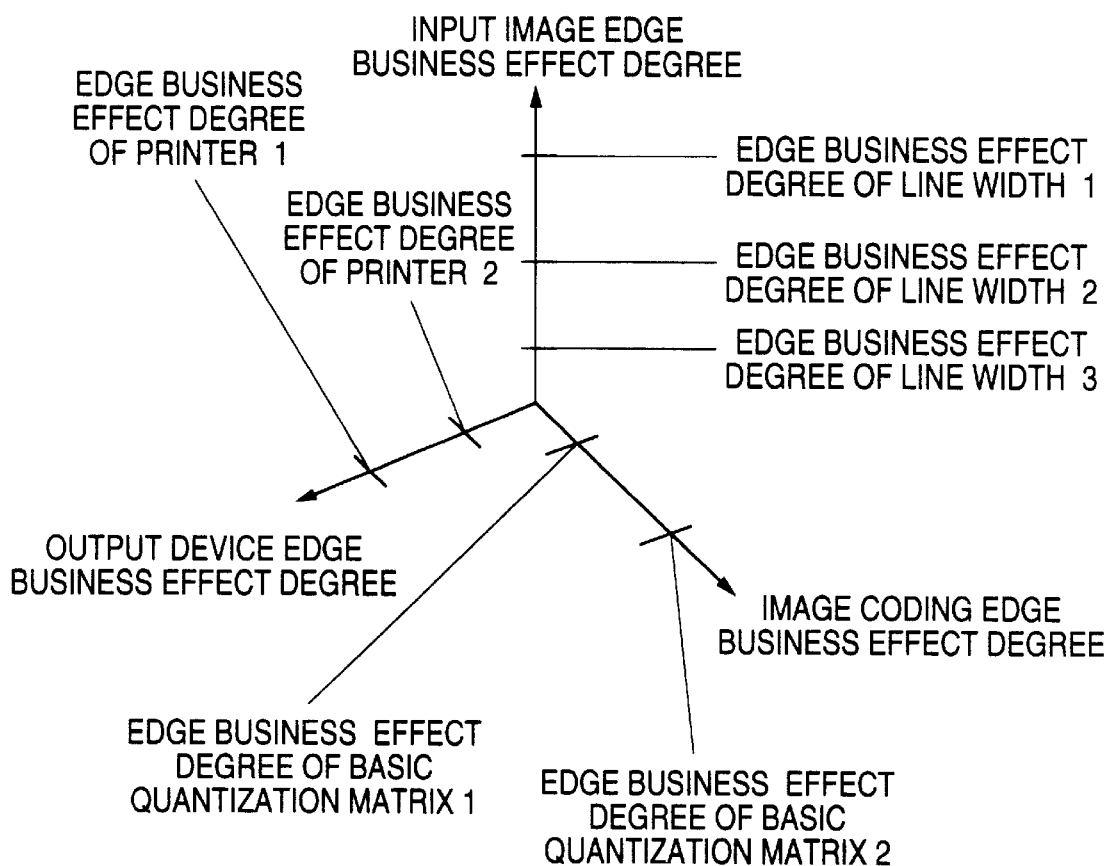
FIG. 37 is an illustration to explain an item-by-item image quality space of the thirteenth embodiment of the invention.

FIG. 37 shows and Tables 3 and 4 list the experiment results of actual measurement of the image quality in item-by-item image quality space.

TABLE 3

| Experiment results with basic quantization matrix 1 | | | | | | | | |
|---|---|---|---|---|---|---|---|---|
| Line width 1 | | | Line width 2 | | | Line width 3 | | |
| SF1 | SF2 | SF3 | SF1 | SF2 | SF3 | SF1 | SF2 | SF3 |
| Printer 1 | | | | | | | | |
| 5.000 | 4.143 | 1.286 | 4.857 | 4.286 | 2.286 | 4.714 | 4.714 | 2.857 |
| Printer 2 | | | | | | | | |
| 4.857 | 2.857 | 1.143 | 5.000 | 3.429 | 1.857 | 5.000 | 3.857 | 2.143 |

TABLE 4

| Experiment results with basic quantization matrix 2 | | | | | | | | |
|---|---|---|---|---|---|---|---|---|
| Line width 1 | | | Line width 2 | | | Line width 3 | | |
| SF1 | SF2 | SF3 | SF1 | SF2 | SF3 | SF1 | SF2 | SF3 |
| Printer 1 | | | | | | | | |
| 4.857 | 3.857 | 1.000 | 4.857 | 4.286 | 1.143 | 5.000 | 4.571 | 1.429 |
| Printer 2 | | | | | | | | |
| 4.571 | 3.857 | 1.000 | 4.714 | 4.143 | 1.000 | 5.000 | 4.429 | 1.286 |

In FIG. 37, two types of printers (printers 1 and 2) are used as standard printers for measuring image quality. Two types of quantization matrixes (basic quantization matrixes 1 and 2) are used as basic quantization matrixes. Further, three types of input image line widths (line widths 1, 2, and 3) are used as input image edge business effect degrees. The relationships between the edge business degrees and scaling factors (SF1, SF2, and SF3) at 12 lattice points of 2×2×3 in total that can be specified with the three axes are found by a subjective evaluation experiment. Table 3 lists the results with the basic quantization matrix 1 and Table 4 lists the results with the basic quantization matrix 2.

To print out on any other printer than the printer 1 or 2, the same method as mapping the printers 1 and 2 on the graph of FIG. 37 is used for mapping on output device edge business effect degree axes of item-by-item image quality space.

The input image line widths are also mapped on input image edge business effect degree axes. Further, to code with a new quantization matrix, mapping is also executed on image coding edge business effect degree axes on a similar criterion to that for mapping the basic quantization matrixes 1 and 2.

Thus, points in the item-by-item evaluation space of edge business for new printers, new input images, and new quantization matrixes can be found. Since the relationship between the image quality and scaling factors is already found at the 12 points listed above, the relationship between the edge business degree and scaling factor at the nearest point among the already found points is uses as the relationship between the edge business degree and scaling factor for the new printer, the new input image, and the new basic quantization matrix.

For example, assume that the edge business effect degree of printer 1 is A1, that the edge business effect degree of printer 2 is A2, that the edge business effect degree of line width 1 is B1, the edge business effect degree of line width 2 is B2, that the edge business effect degree of line width 3 is B3, that the edge business effect degree of basic quantization matrix 1 is C1, and that the edge business effect degree of basic quantization matrix 2 is C2. Table 3 lists the image qualities when input, output, and image coding are performed for each edge business effect degree. Assume that the measurement result of the edge business effect degree of a new printer is A1, that the edge business effect degree of new output is B1, and that the edge business effect degree of a new quantization matrix is C1. In this case, it is predicted that the relationship between the scaling factor and the image quality is indicated by three elements including line width 1 and printer 1 in Table 3. The three elements represent the scaling factor and edge business degree as shown in FIG. 36. Here, an example wherein the number of points is three is given; if the number of points is increased, more accurate edge business degree prediction is enabled. If the desired edge business degree is 4.143, SF2 may be selected for coding.

Likewise, the relationship between the blur degree in item-by-item image quality space of blur and scaling factor can be found by subjective evaluation. The blur control method determination circuit 362 can also find the blur control method 364.

The scaling factor determination circuit 365 finds a scaling factor for setting a predetermined edge business amount and a scaling factor for setting a predetermined blur amount, determines the scaling factor for making the image quality better between the two scaling factors, and outputs the scaling factor 366.

A multiplier 368 multiplies the basic quantization matrix 367 by the scaling factor 366 to generate the quantization matrix 369 and sends the quantization matrix 369 to the quantization circuit 254, which then executes quantization with the quantization matrix 369 sent from the multiplier 368.

In the thirteenth embodiment, the relationship between coding parameter and subjective evaluation value when the effect degrees for the image input means or input image portion, the image coding system, and the image output means are determined is previously determined for each image quality degradation item. Then, the effect degree of each image quality degradation item is measured for the image input means or input image portion, the effect degree of each image quality degradation item is measured for the image coding system, and the effect degree of each image quality degradation item is measured for the image output means, whereby the relationship between the coding parameter and the predication value of the subjective evaluation of each image quality degradation item can be found.

Further, a coding parameter satisfying predetermined subjective evaluation image quality can be found from the relationship between the coding parameter and the predication value of the subjective evaluation of each image quality degradation item.

Embodiment 14

Next, a fourteenth embodiment of the invention will be discussed. In the first to thirteenth embodiments, the image quality degradation items are edge business and blur, but not limited to them. The following image quality degradation items and the following input image effect degree determination techniques and output device effect degree determination techniques related to the image quality degradation items are available.

(1) Pseudo Contour
Input image effect degree determination technique: Prepares a frequency distribution of pixel values of an input image and measures the number of pixel value types.
Output device effect degree determination technique: Measures the effective number of gray levels of printer.

(2) Block Distortion
Input image effect degree determination technique: Measures pixel value change of block peripheral pixels.
Output device effect degree determination technique: Measures the effective number of gray levels and frequency characteristic of printer.

(3) Granular Noise
Input image effect degree determination technique: Measures power of signals at high and low frequencies of input image.
Output device effect degree determination technique: Measures the effective number of gray levels and frequency characteristic of printer.

(4) Beat
Input image effect degree determination technique: Measures power of signals at high and low frequencies of input image.
Output device effect degree determination technique: Measures the effective number of gray levels and frequency characteristic of printer.

(5) Mosquito Noise
Input image effect degree determination technique: Measures power of signals at high and low frequencies of input image.
Output device effect degree determination technique: Measures the effective number of gray levels and frequency characteristic of printer.

Embodiment 15

Next, a fifteenth embodiment of the invention will be discussed. In the embodiments, the input image effect degree, the output device effect degree, and the coding system effect degree can be all mapped in a one-dimensional space, but the mapping space is not limited to the one-dimensional space.

For example, the number of pixel value types of pixel values 0–127 and the number of pixel value types of pixel values 128–255 of an input image are taken, whereby the pseudo contour effect degrees of the input image can be mapped in a two-dimensional space.

Embodiment 16

Next, a sixteenth embodiment of the invention will be discussed. In the embodiments, the coding system is JPEG, but not limited to it.

A prediction coding system can control image quality by changing the quantization step size. It is a coding system for using an already coded pixel to predict the next pixel value and coding a prediction error thereof.

Figure 38:
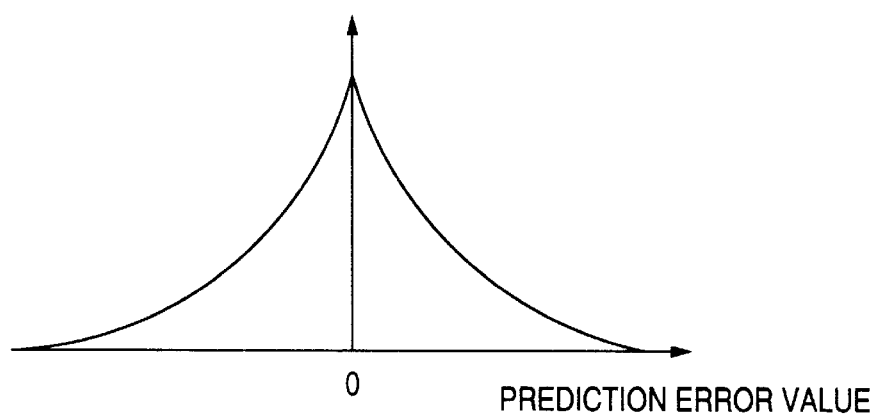
FIG. 38 is an illustration to explain prediction coding in a thirteenth embodiment of the invention.
Figure 39:
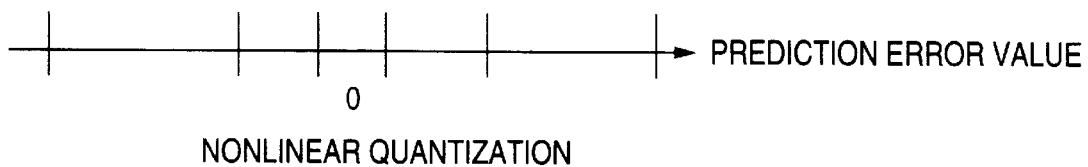
FIG. 39 is an illustration to explain prediction coding in the sixteenth embodiment of the invention.
Figure 39:
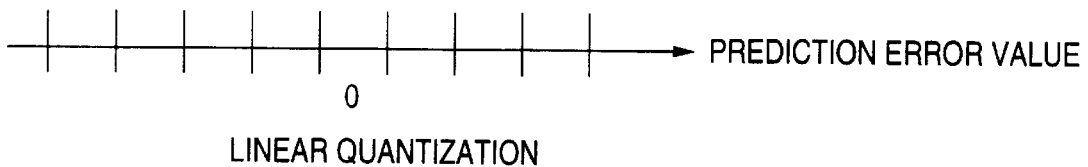

A prediction error signal distribution becomes a distribution leaning to 0 as shown in FIG. 38. The quantization step for quantizing the prediction error signal is determined in various manners. Nonlinear quantization and linear quantization as shown in FIG. 39 are available. The vertical lines in FIG. 39 denote quantization threshold values.

The quantization patterns can be handled as quantization matrixes in JPEG.

Embodiment 17

Next, a seventeenth embodiment of the invention will be discussed.

The seventeenth embodiment is realized by providing the seventh embodiment in a more specific configuration. It will be discussed with reference to FIGS. 12–17, 22, 23, 28, 29, 31, and 33. The components, reference numbers, etc., shown in FIGS. 22, 23, 28, 29, 31, and 33 are the same as those described in the corresponding embodiments. The operation in FIGS. 22, 31, and 33 is also the same as that described in the corresponding embodiments.

Here, the correspondence between the components shown in FIGS. 22, 23, 28, 29, 31, and 33 and those shown in FIGS. 12–17 will be mainly discussed and specific configuration will not be discussed in detail.

First, the correspondence with the components in FIG. 13 will be discussed. In FIGS. 22, 31, and 33, the input image edge business effect degree determination circuit 258 and the input image blur effect degree determination circuit 259 correspond to the input image property input means 152. The output device edge business effect degree determination circuit 264 and the output device blur effect degree determination circuit 265 correspond to the image output property input means 155. The coding system edge business effect degree determination circuit 270 and the coding system blur effect degree determination circuit 271 correspond to the image coding property input means 158. The edge business degree determination circuit 275 and the blur degree determination circuit 276 correspond to the image quality prediction means 160. The edge business degree 277 and the blur degree 278 correspond to the item-by-item image quality 161. The total image quality determination circuit 279 corresponds to the total image quality prediction means 163. Further, the total image quality 280 corresponds to the total image quality 164.

The correspondence with the components in FIG. 15 will be discussed. In FIG. 23, the edge detection circuit 291 corresponds to the image analysis means 182. The binarization circuit 292 and the line width detection circuit 293 correspond to the input image quality effect degree calculation means 184.

The correspondence with the components in FIG. 16 will be discussed. In FIG. 28, the address calculation circuit 303 and the edge business effect degree memory 305 correspond to the image output image quality effect degree storage means 192. The edge business effect degree calculation circuit 307 corresponds to the image output image quality effect degree calculation means 194.

The correspondence with the components in FIG. 17 will be discussed. In FIG. 29, the address calculation circuit 311 and the edge business effect degree memory 313 correspond to the image coding image quality effect degree storage means 201. The edge business effect degree calculation circuit 315 corresponds to the image coding image quality effect degree calculation means 203.

The operation of the input image edge business effect degree determination circuit 258, the input image blur effect degree determination circuit 259, the output device edge business effect degree determination circuit 264, the output device blur effect degree determination circuit 265, the coding system edge business effect degree determination circuit 270, the coding system blur effect degree determination circuit 271, the edge business degree determination circuit 275, the blur degree determination circuit 276, and the total image quality determination circuit 279 is the same as that described in the ninth embodiment.

It is clear that likewise, the eighth embodiment can also be realized specifically.

Embodiment 18

Next, an eighteenth embodiment of the invention will be discussed.

The eighteenth embodiment will be discussed with reference to FIGS. 18–20 and 34. The components, reference numbers, etc., shown in FIG. 34 are the same as those described in the thirteenth embodiment. The operation in FIG. 34 is the same as that described in the ninth embodiment.

Here, the correspondence between the components shown in FIG. 34 and those shown in FIGS. 18–20 will be mainly discussed.

In FIG. 34, the input image edge business effect degree determination circuit 258 and the input image blur effect degree determination circuit 259 correspond to the input image property input means 152. The output device edge business effect degree determination circuit 264 and the output device blur effect degree determination circuit 265 correspond to the image output property input means 155. The coding system edge business effect degree determination circuit 270 and the coding system blur effect degree determination circuit 271 correspond to the image coding property input means 158. The edge business control method determination circuit 361 and the blur control method determination circuit 362 correspond to the image quality control method determination means 220. The edge business control method 363 and the blur control method 364 correspond to the item-by-item image quality control method 221. The scaling factor determination circuit 365 corresponds to the total image quality control means 223. Further, the scaling factor 366 corresponds to the coding parameter 224. In the embodiment, desired image quality is fixed and desired image quality input means 211 is previously built in the scaling factor determination circuit 365.

The operation of the input image edge business effect degree determination circuit 258, the input image blur effect degree determination circuit 259, the output device edge business effect degree determination circuit 264, the output device blur effect degree determination circuit 265, the coding system edge business effect degree determination circuit 270, the coding system blur effect degree determination circuit 271, the edge business control method determination circuit 361, the blur control method determination circuit 362, and the scaling factor determination circuit 365 is the same as that described in the thirteenth embodiment.

Further, the configuration wherein the desired image quality input means 211 is not previously built in the scaling factor determination circuit 365 will be discussed with reference to FIG. 40.

Figure 40:
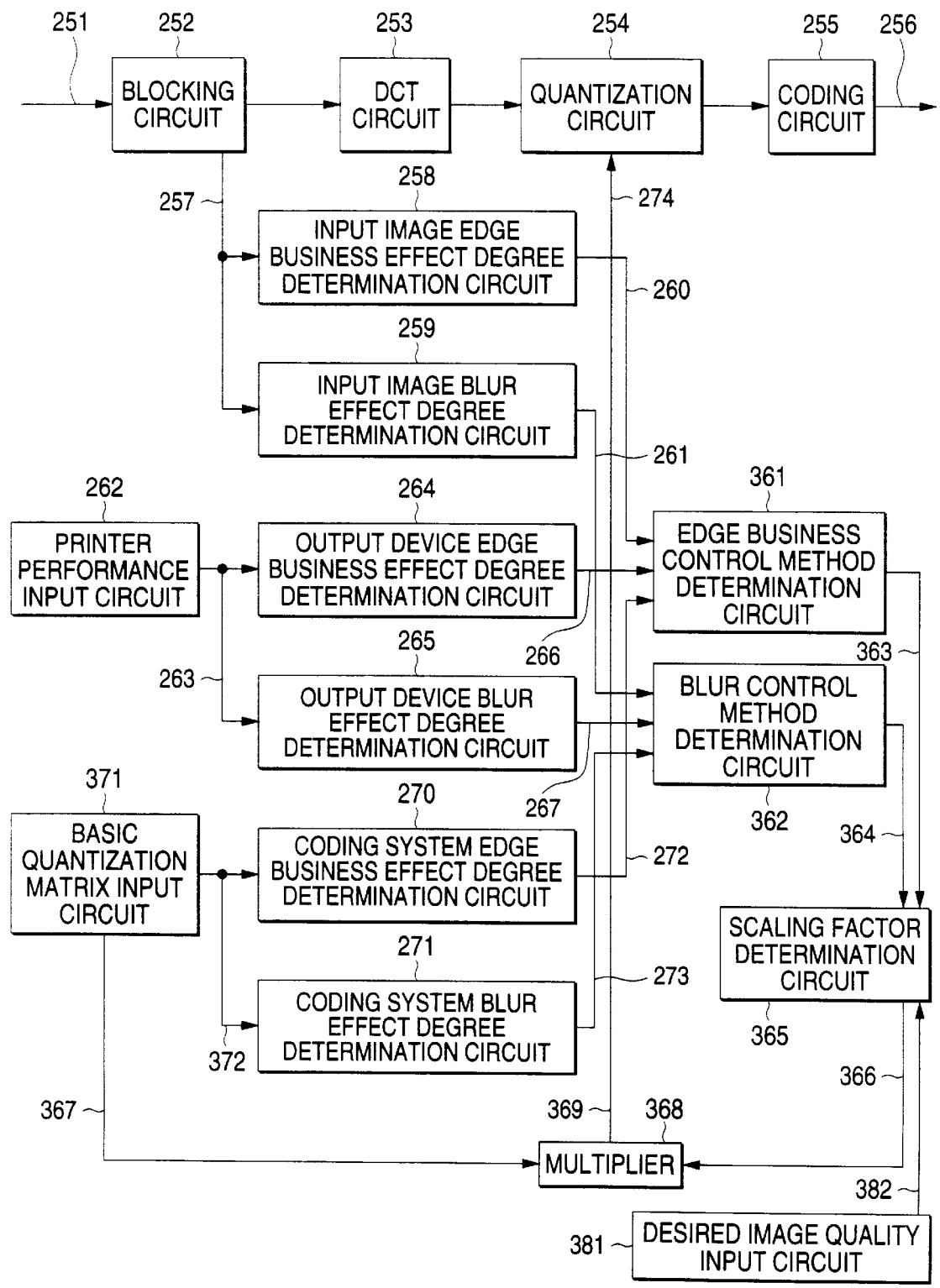
FIG. 40 is a block diagram to explain an eighteenth embodiment of the invention.
Figure 41:
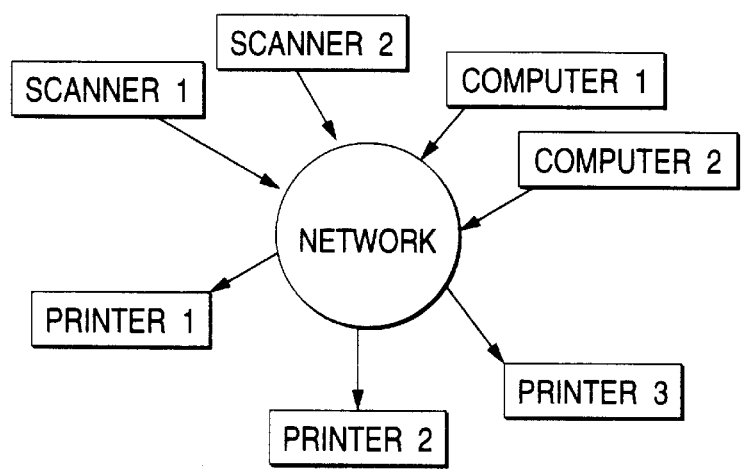
FIG. 41 is an illustration to show an environment example to which the invention is applied.
Figure 42:
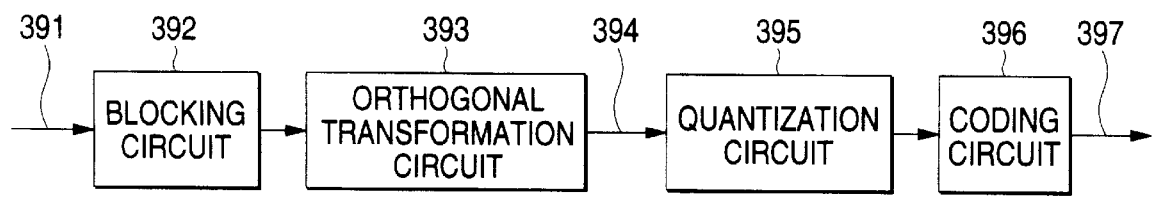
FIG. 42 is a block diagram to explain a conventional example.
Figure 43:
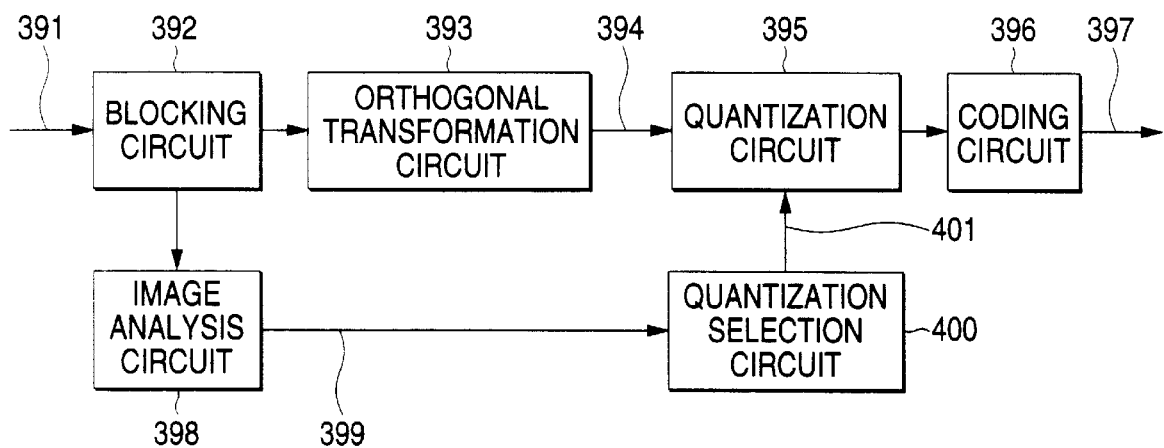
FIG. 43 is a block diagram to explain a conventional example.
Figure 44:
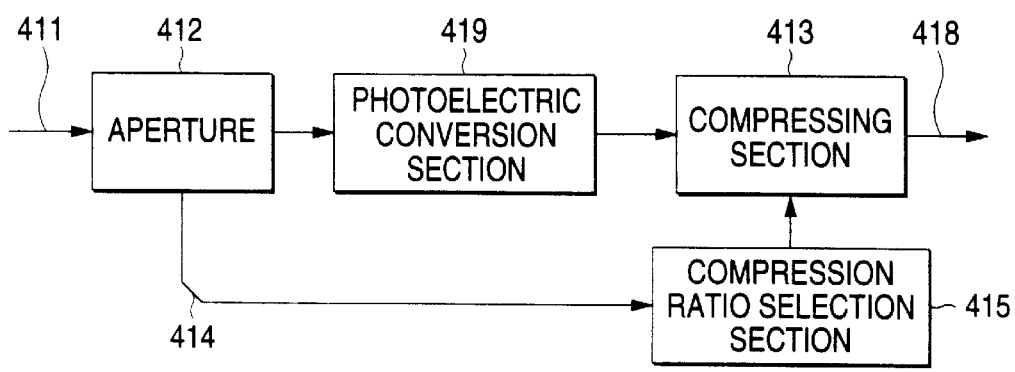
FIG. 44 is a block diagram to explain a conventional example.
Figure 45:
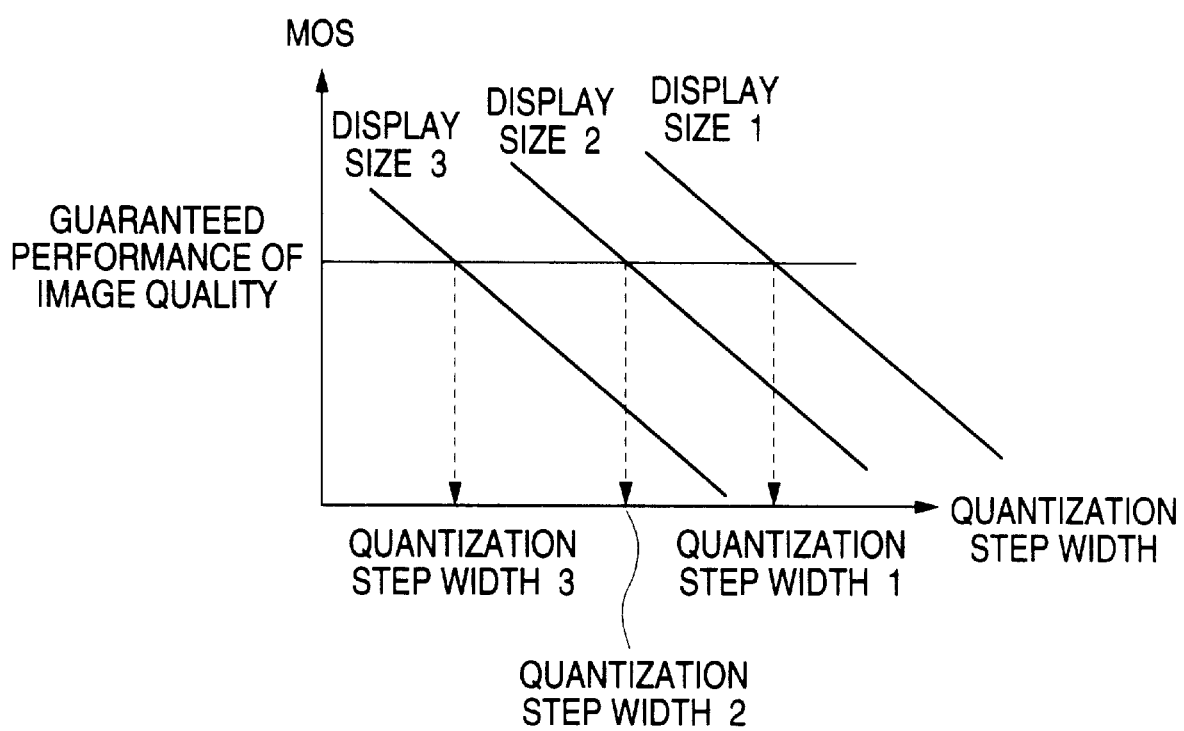
FIG. 45 is an illustration to explain a subjective evaluation experiment.

In FIG. 40, numeral 381 is a desired image quality input circuit and numeral 382 is desired image quality. Other reference numerals are identical with those in FIG. 34.

In FIG. 40, the desired image quality input circuit 381 corresponds to the desired image quality input means 211 and the desired image quality 382 corresponds to the desired image quality 212.

The scaling factor determination circuit 365 determines a scaling factor from the relationship between the edge business degree and scaling factor as shown in FIG. 36. The input desired image quality contains a desired edge business degree and a scaling factor is determined from the desired edge business degree as shown in FIG. 36.

Likewise, a scaling factor is determined from a desired blur degree.

Thus, the scaling factor determination circuit 365 determines scaling factors from one or more image quality degradation items and outputs the smallest scaling factor for producing the best image quality from among the determined scaling factors.

As we have discussed, according to the invention, image quality is measured for each divided image quality item, whereby various input physical amounts of an input image property, an output machine property, an input machine property, an image coding system property, etc., can be mapped in a space consisting of continuous parameters. Further, the total image quality can be found from the image quality for each image quality item, whereby when a plurality of physical amounts are measured, image quality control can also be performed.

What is claimed is:

1. An image quality prediction apparatus comprising:
   a plurality of item-by-item image quality prediction means; and
   total image quality prediction means for determining total evaluated image quality in response to degradation degrees predicted by said plurality of item-by-item image quality prediction means, wherein
   each of said plurality of item-by-item image quality prediction means comprises:
      input image property space placement means for finding a position of an input image property in a space where a degradation degree varies continuously for the input image property having relation to an image quality degradation evaluation item causing image quality degradation of an input image;
      image coding property space placement means for finding a position of an image compression property in a space where a degradation degree varies continuously for the image compression property affecting the image quality degradation evaluation item causing image quality degradation of an image compressed in non-reversible coding;
      output device property space placement means for finding a position of an output device property in a space where a degradation degree varies continuously for the output device property affecting the image quality degradation evaluation item causing image quality degradation of an output image; and
      image quality degradation degree prediction means for predicting a degradation degree for the image quality degradation evaluation item of the image in response to the position of the input image property found by said input image property space placement means, the position of the image compression property found by said image coding property space placement means, and the position of the output device property found by said output device property space placement means, in relation to the corresponding image quality degradation evaluation item.

2. The image quality prediction apparatus of claim 1, wherein
   each of said plurality of item-by-item image quality prediction means further includes:
      input image property determination means being responsive to a parameter of an image input device for controlling an image quality of an image input through the image input device for finding a property of the input image, and wherein
      said input image property space placement means uses the input image property found by said input image property determination means.

3. The image quality prediction apparatus of claim 1, wherein
   each of said plurality of item-by-item image quality prediction means further includes:
      input image property determination means for analyzing an input image so as to find a property of the input image, and wherein
      said input image property space placement means uses the input image property found by said input image property determination means.

4. The image quality prediction apparatus of claim 1, wherein
   said total image quality prediction means determines that the minimum value of the degradation degrees predicted by said image quality degradation degree prediction means contained in said plurality of item-by-item image quality prediction means is adopted as total evaluated image quality.

5. The image quality prediction apparatus of claim 1, wherein
   said total image quality prediction means determines that a linear sum of the degradation degrees predicted by said image quality degradation degree prediction means contained in said plurality of item-by-item image quality prediction means is adopted as total evaluated image quality.

6. An image quality control apparatus comprising:
   a plurality of item-by-item image quality control method determination means; and
   total image quality control means for determining a coding parameter in image compression to accomplish desired image quality in response to relationship between degradation degrees determined by said plurality of item-by-item image quality control method determination means and coding parameters, wherein
   each of said plurality of item-by-item image quality control method determination means comprises:
      input image property space placement means for finding a position of an input image property in a space where a degradation degree varies continuously for the input image property having relation to an image quality degradation evaluation item causing image quality degradation of an input image;
      image coding property space placement means for finding a position of an image compression property in a space where a degradation degree varies continuously for the image compression property affecting the image quality degradation evaluation item causing image quality degradation of an image compressed in non-reversible coding;
      output device property space placement means for finding a position of an output device property in a space where a degradation degree varies continuously for the output device property affecting the image quality degradation evaluation item causing image quality degradation of an output image; and
      image quality control method determination means for determining relationship between a degradation degree for the image quality degradation evaluation item and a coding parameter in image compression in response to the position of the input image quality found by said input image property space placement means, the position of the image compression property found by said image coding property space placement means, and the position of the output device property found by said output device property space placement means, in relation to the corresponding image quality degradation evaluation item.

7. The image quality control apparatus of claim 6, wherein each of said plurality of item-by-item image quality control method determination means further includes:
input image property determination means being responsive to a parameter of an image input device for controlling an image quality of an image input through the image input device for finding a property of the input image, and wherein
said input image property space placement means uses the input image property found by said input image property determination means.

8. The image quality control apparatus of claim 6, wherein each of said plurality of item-by-item image quality control method determination means further includes:
input image property determination means for analyzing an input image so as to find a property of the input image, and wherein
said input image property space placement means uses the input image property found by said input image property determination means.

9. The image quality control apparatus of claim 6, wherein said total image quality control means determines a coding parameter to accomplish desired image quality and provide the minimum compression ratio based on the relationship between the degradation degree and coding parameter in image compression determined by said image quality control method determination means contained in each of said plurality of item-by-item image quality control method determination means.

10. An image quality control apparatus comprising:
image division means for dividing an input image into a plurality of divided images constituted by a predetermined number of picture elements;
conversion means for converting said divided images divided by said image division means into converted coefficients;
image analysis means for finding a property of said divided images divided by said image division means;
image output property output means for outputting a property of image output means;
quantization method selection means for selecting a quantization method in response to the divided image property found by said image analysis means and the image output means property output by said image output property output means;
quantization means for quantizing the conversion coefficients found by said conversion means by the quantization method selected by said quantization method selection means; and
coding means for coding the conversion coefficients quantized by said quantization means.

11. The image quality control apparatus of claim 10, wherein
the image output means property output by said image output property output means includes:
the effective number of gray levels of said image output means.

12. The image quality control apparatus of claim 10, wherein
the image output means property output by said image output property output means includes:
an output frequency characteristic of said image output means.

13. The image quality control apparatus of claim 10, wherein
the divided image property found by said image analysis means includes:
a line width in said divided image.

14. The image quality control apparatus of claim 10, wherein
the divided image property found by said image analysis means includes:
a power distribution for each frequency of the divided image.

15. An image quality control apparatus comprising:
image division means for dividing an input image into given constant areas;
conversion means for converting the image divided by said image division means and finding a conversion coefficients;
image analysis means for finding a property of the image divided by said image division means;
image coding property output means for outputting a property of a quantization method and a property of said conversion means;
quantization method selection means for selecting a quantization method in response to the divided image property found by said image analysis means and the quantization method property and the conversion means property output by said image coding property output means;
quantization means for quantizing the conversion coefficients found by said conversion means by the quantization method selected by said quantization method selection means; and
coding means for coding the conversion coefficients quantized by said quantization means.

16. The image quality control apparatus of claim 15, wherein
the conversion means property output by said image coding property output means includes:
a property related to discrete cosine transform.

17. The image quality control apparatus of claim 15, wherein
the conversion means property output by said image coding property output means includes:
a property related to conversion based on prediction.

18. The image quality control apparatus of claim 15, wherein
the divided image property found by said image analysis means includes:
a line width in the divided image.

19. The image quality control apparatus of claim 15, wherein
the divided image property found by said image analysis means includes:
a power distribution for each frequency of the divided image.

20. An image quality prediction apparatus comprising:
a plurality of item-by-item image quality prediction means each including:

input image property input means for inputting a property of an input image affecting an image quality degradation evaluation item causing image quality degradation of an input image, image coding property input means for inputting a property of image compression affecting an image quality degradation evaluation item causing image quality degradation of an image compressed in non-reversible coding, output device property input means for inputting a property of an output device affecting an image quality degradation evaluation item causing image quality degradation of an output image, and image quality degradation degree prediction means for predicting a degradation degree for the image quality degradation evaluation item of the image in response to the input image property input by said input image property input means, the image compression property input by said image coding property input means, and the output device property input by said output device property input means, for a plurality of image quality degradation evaluation items; and total image quality prediction means for determining total evaluated image quality in response to evaluated image quality predicted by said image quality degradation degree prediction means contained in each of said plurality of item-by-item image quality prediction means.

21. The image quality prediction apparatus of claim 20, wherein each of said plurality of item-by-item image quality prediction means further includes:

a memory for storing evaluated image quality determined by the input image property, the image compression property, and the output device property, and previously found by an evaluation experiment for each image quality degradation evaluation item, and wherein said image quality degradation degree prediction means reads the evaluated image quality stored in said memory by using the input image property input by said input image property input means, the image compression property input by said image coding property input means, and the output device property found by said output device property input means.

22. The image quality prediction apparatus of claim 21, wherein if evaluated image quality corresponding to the input image property input by said input image property input means, the image compression property input by said image coding property input means, and the output device property found by said output device property input means is not stored in said memory, said image quality degradation degree prediction means uses values close to the input image property input by said input image property input means, the image compression property input by said image coding property input means, and the output device property found by said output device property input means to read relationship between the evaluated image quality stored in said memory and coding parameter in image compression.

23. An image quality control apparatus comprising:

a plurality of item-by-item image quality control method determination means each including:

input image property input means for inputting a property of an input image affecting an image quality degradation evaluation item causing image quality degradation of an input image, image coding property input means for inputting a property of image compression affecting an image quality degradation evaluation item causing image quality degradation of an image compressed in non-reversible coding, output device property input means for inputting a property of an output device affecting an image quality degradation evaluation item causing image quality degradation of an output image, and image quality control method determination means for determining relationship between a degradation degree for the image quality degradation evaluation item and coding parameter in image compression in response to the input image property input by said input image property input means, the image compression property input by said image coding property input means, and the output device property input by said output device property input means, for a plurality of image quality degradation evaluation items;

desired image quality input means for an operator to enter desired image quality; and total image quality control means for determining a coding parameter to accomplish the desired image quality entered through said desired image quality input means in response to the relationship between the evaluated image quality and coding parameter determined by said image quality control method determination means contained in each of said plurality of item-by-item image quality control method determination means.

24. The image quality control apparatus of claim 23, wherein each of said plurality of item-by-item image quality control method determination means further includes a memory for storing relationship between evaluated image quality determined by the input image property, the image compression property, and the output device property and previously found by an evaluation experiment for each image quality degradation evaluation item and coding parameter in image compression, and wherein said image quality control method determination means reads the relationship between the evaluated image quality and coding parameter in image compression stored in said memory by using the input image property input by said input image property input means, the image compression property input by said image coding property input means, and the output device property found by said output device property input means.

25. The image quality control apparatus of claim 24, wherein if the relationship between the evaluated image quality and coding parameter in image compression corresponding to the input image property input by said input image property input means, the image compression property input by said image coding property input means, and the output device property found by said output device property input means is not stored in said memory, said image quality control method determination means uses values close to the input image property input by said input image property input means, the image compression property input by said image coding property input means, and the output device property found by said output device property input means to read the relationship between the evaluated image quality and coding parameter in image compression stored in said memory.

26. The image quality control apparatus of claim 23, further including:

input image analysis means for analyzing an input image and input image quality effect degree calculation means for calculating an effect degree for an image quality degradation evaluation item in response to the analysis result of said input image analysis means, said input image property input means for inputting the effect degree calculated by said input image quality effect degree calculation means.

27. The image quality control apparatus of claim 26, wherein said input image analysis means includes as a property of the input image to be analyzed;

any one or more of the number of pixel value types of the input image, pixel value change of peripheral pixels, power of low-frequency and high-frequency signals, and image quality when a given image is coded by a given coding apparatus and the resultant image is output on a given output device.

28. The image quality control apparatus of claim 23, wherein said output device property input means includes as a property of an output device;

any one or more of resolution of the output device, the number of gray levels, a frequency transfer characteristic, dot form, dot print accuracy, the number of halftone dot lines, halftone dot form, tone curve, contrast, and image quality when a given image is coded by a given coding apparatus.

29. The image quality control apparatus of claim 23, wherein said image coding property input means includes as a property of image compression;

any one or more of a blocking technique, a quantization characteristic, a frequency transfer characteristic, a subsampling technique, an interpolation technique, and a conversion technique when the image compression is executed, and image quality when a given image is output by a given output device.

30. The image quality control apparatus of claim 23, wherein said input image property input means includes as a property of an input image;

any one or more of image quality when the input image is coded by a given coding apparatus and the resultant image is output on a given output device and input camera aperture information, pixel density, pixel size, and the number of quantization bits of image input device property.

31. An image quality control apparatus comprising:

a plurality of item-by-item image quality control method determination means each including:

input image property input means for inputting a property of an input image affecting an image quality degradation evaluation item causing image quality degradation of an input image, image coding property input means for inputting a property of image compression affecting an image quality degradation evaluation item causing image quality degradation of an image compressed in non-reversible coding, output device information input means for inputting information concerning an output device, and image quality control method determination means for determining relationship between a degradation degree for the image quality degradation evaluation item and coding parameter in image compression in response to the input image property input by said input image property input means, the image compression property input by said image coding property input means, and the output device information input by said output device information input means, for a plurality of image quality degradation evaluation items;

target image quality input means for inputting target image quality; and total image quality control means for determining a coding parameter to accomplish the target image quality input by said target image quality input means in response to the relationship between the evaluated image quality and coding parameter determined by said image quality control method determination means contained in each of said plurality of item-by-item image quality control method determination means.

32. An image quality prediction method comprising:

step A of finding a position of an input image property in a space where a degradation degree varies continuously for the input image property having relation to an image quality degradation evaluation item causing image quality degradation of an input image;

step B of finding a position of an image compression property in a space where a degradation degree varies continuously for the image compression property affecting an image quality degradation evaluation item causing image quality degradation of an image compressed in non-reversible coding;

step C of finding a position of an output device property in a space where a degradation degree varies continuously for the output device property affecting an image quality degradation evaluation item causing image quality degradation of an output image; and step D of predicting a degradation degree for the image quality degradation evaluation item of the image in response to the position of the input image property found in said step A, the position of the image compression property found in said step B, and the position of the output device property found in said step C, for a plurality of image quality degradation evaluation items; and step E of determining total evaluated image quality in response to the evaluated image quality predicted for each of the image quality degradation evaluation items.

33. An image quality control method comprising:

step A of finding a position of an input image property in a space where a degradation degree varies continuously for the input image property having relation to an image quality degradation evaluation item causing image quality degradation of an input image;

step B of finding a position of an image compression property in a space where a degradation degree varies continuously for the image compression property affecting an image quality degradation evaluation item causing image quality degradation of an image compressed in non-reversible coding;

step C of finding a position of an output device property in a space where a degradation degree varies continuously for the output device property affecting an image quality degradation evaluation item causing image quality degradation of an output image; and step D of determining relationship between a degradation degree for the image quality degradation evaluation item and coding parameter in image compression in response to the position of the input image property found in said step A, the position of the image compression property found in said step B, and the position of the output device property found in said step C, for a plurality of image quality degradation evaluation items; and step E of determining a coding parameter to accomplish desired image quality in response to the relationship between the evaluated image quality and coding parameter determined for each of the image quality degradation evaluation items.

* * * * *